US010326994B2

(12) United States Patent
Chiang et al.

(10) Patent No.: US 10,326,994 B2
(45) Date of Patent: Jun. 18, 2019

(54) MODIFYING A SCAN ORDER TO LIMIT SCAN DISTANCE

(71) Applicant: GOOGLE LLC, Mountain View, CA (US)

(72) Inventors: Ching-Han Chiang, San Jose, CA (US); Yaowu Xu, Saratoga, CA (US); Jingning Han, Santa Clara, CA (US); Jia Feng, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/950,225

(22) Filed: Apr. 11, 2018

(65) Prior Publication Data

US 2019/0058883 A1 Feb. 21, 2019

Related U.S. Application Data

(60) Provisional application No. 62/545,570, filed on Aug. 15, 2017.

(51) Int. Cl.
*H04N 19/00* (2014.01)
*H04N 19/129* (2014.01)
(Continued)

(52) U.S. Cl.
CPC ......... *H04N 19/129* (2014.11); *H04N 19/124* (2014.11); *H04N 19/13* (2014.11);
(Continued)

(58) Field of Classification Search
CPC ........... H04N 19/00; H04N 11/00; H04N 7/00
See application file for complete search history.

(56) References Cited

U.S. PATENT DOCUMENTS 5,721,822 A     2/1998  Agarwal
2004/0228410 A1*  11/2004  Ameres ................. H04N 19/52
                                                                  375/240.18
(Continued)

FOREIGN PATENT DOCUMENTS

WO    2012/054805 A1    4/2012
WO    2016/118220 A1    7/2016

OTHER PUBLICATIONS

Ching-Han Chiang et al., "A constrained adaptive scan order approach to transform coefficient entropy coding", 2017 IEEE International Conference of Acoustics, Speech and Signal Processing (ICASSP), IEEE, Mar. 5, 2017, pp. 1298-1302.
(Continued)

*Primary Examiner* — Maryam A Nasri
(74) *Attorney, Agent, or Firm* — Young Basile Hanlon & MacFarlane, P.C.

(57) ABSTRACT

A method for coding a transform block of coefficients includes generating a new scan order from the original scan order such that a maximum scan distance of the new scan order is smaller than or equal to a predetermined distance, and coding the coefficients based on the new scan order. An apparatus for decoding a transform block of coefficients. The apparatus includes a memory and a processor. The memory includes instructions executable by the processor to identify an original scan order for encoding the coefficients, generate a new scan order from the original scan order such that a maximum scan distance of the new scan order is less than or equal to a predetermined distance, and decode, from an encoded bitstream, the coefficients based on the new scan order.

14 Claims, 14 Drawing Sheets

(51) Int. Cl.
H04N 19/159 (2014.01)
H04N 19/61 (2014.01)
H04N 19/86 (2014.01)
H04N 19/13 (2014.01)
H04N 19/82 (2014.01)
H04N 19/124 (2014.01)

(52) U.S. Cl.
CPC ........... H04N 19/159 (2014.11); H04N 19/61 (2014.11); H04N 19/82 (2014.11); H04N 19/86 (2014.11)

(56) References Cited

U.S. PATENT DOCUMENTS

| 2008/0310504 | A1* | 12/2008 | Ye | H04N 19/197 375/240.02 |
| 2016/0212430 | A1* | 7/2016 | Ventelae | H04N 19/134 |

OTHER PUBLICATIONS

International Search Report and Written Opinion in PCT/US2018/031234, dated Aug. 1, 2018, 12 pgs.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

MODIFYING A SCAN ORDER TO LIMIT SCAN DISTANCE

CROSS-REFERENCE TO RELATED APPLICATION(S)

This application claims priority to and the benefit of U.S. Provisional Application Patent Ser. No. 62/545,570, filed Aug. 15, 2017, the entire disclosure of which is hereby incorporated by reference herein.

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques, and to reduce the complexity and cost of hardware involved in the compression and the encoding techniques.

SUMMARY

An aspect of this disclosure is a method for coding a transform block of coefficients. The method includes identifying an original scan order for coding the coefficients, generating a new scan order from the original scan order such that a maximum scan distance of the new scan order is smaller than or equal to a predetermined distance, and coding the coefficients based on the new scan order.

Another aspect is an apparatus for encoding a transform block of coefficients. The apparatus includes a memory and a processor. The memory includes instructions executable by the processor to identify an original scan order for encoding the coefficients, generate a new scan order from the original scan order such that a maximum scan distance of the new scan order is less than or equal to a predetermined distance, and encode, in an encoded bitstream, the coefficients based on the new scan order.

Yet another aspect is an apparatus for decoding a transform block of coefficients. The apparatus includes a memory and a processor. The memory includes instructions executable by the processor to identify an original scan order for encoding the coefficients, generate a new scan order from the original scan order such that a maximum scan distance of the new scan order is less than or equal to a predetermined distance, and decode, from an encoded bitstream, the coefficients based on the new scan order.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
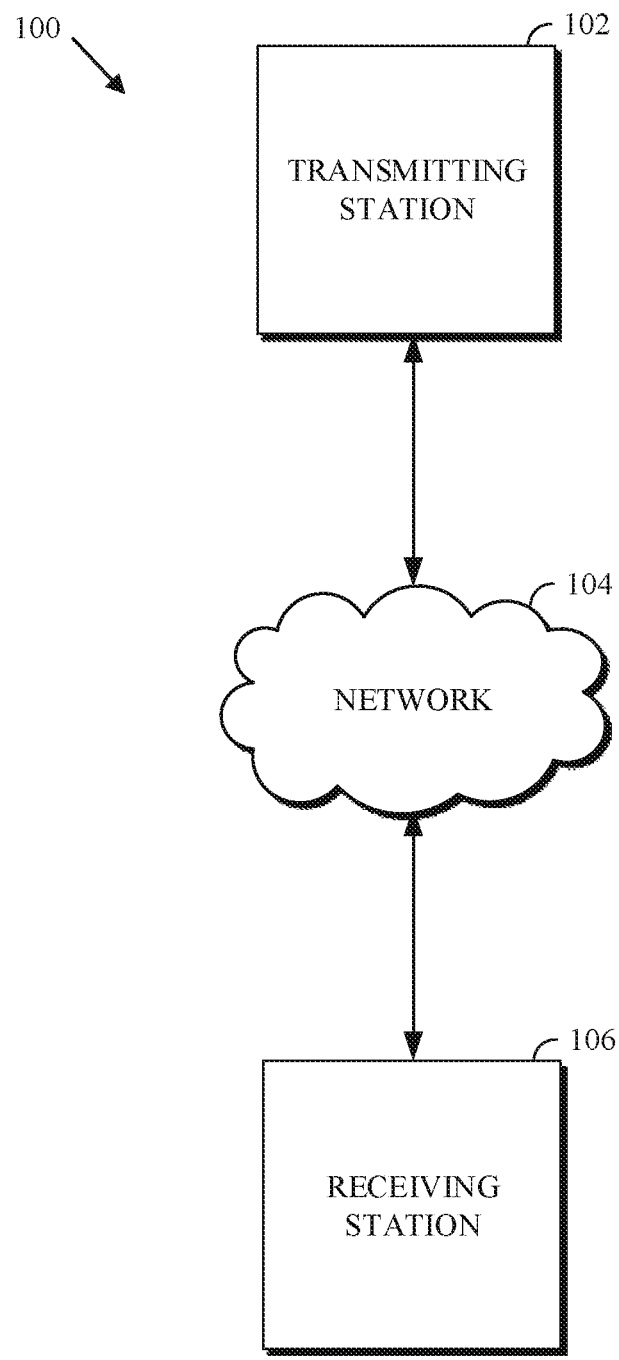
FIG. 1 is a schematic of a video encoding and decoding system.

Video compression schemes may include breaking each image, or frame, into smaller portions, such as blocks, and generating an output bitstream using techniques to limit the information included for each block in the output. An encoded bitstream can be decoded to recreate the blocks and the source images from the limited information. Coding a video stream can include entropy coding of quantized transform coefficients of a quantized transform block.

Entropy coding is a lossless compression technique that may include substituting tokens, or codewords, for bit patterns, or symbols, in the output data stream. In some implementations, the token for a symbol may be determined based on context coefficients, such as the coefficient immediately to the left of a current coefficient being encoded, the coefficient immediately above the current coefficient, or a combination of both. Other context coefficients can be used. The transform coefficients of the quantized transform block can be encoded according to a scan order. The scan order specifies the order in which the transform coefficients are traversed. Scan orders tend to cluster zero value coefficients at the end of the scan order. The cluster of zero value coefficients at the end of the scan order can be referred to as the zero coefficient tail. The zero coefficient tail can be exploited to improve the compression performance.

As mentioned above, the coefficients of the quantized transform block can be traversed according to the scan order. A visited (i.e., traversed) coefficient is then entropy coded. Probability distributions for entropy coding the non-zero transform coefficients may be identified based on context.

For example, the entropy coding of the coefficients of a transform block can map the 2-dimensional transform coefficient block into a 1-dimensional sequence (i.e., the scan order). The scan order can be a hard-coded (i.e., predetermined) scan order. Examples of predetermined scan orders include a zig-zag order and a column biased zig-zag order. The scan order selected can depend on the type of transform applied to the transform block. For example, the zig-zag scan order can be selected when a 2D-DCT transform is applied. For example, the column biased zig-zag scan order can be selected when an ADST-DCT combination transform is applied.

In some implementations, a context-adaptive scan order for entropy coding can be used to improve coding efficiency by generating a context-adaptive scan order. For example, the adaptive scan order can be a context-constrained non-zero-probability-adaptive scan order wherein the positions of transform coefficients in the context-adaptive scan order is based on a descending probability that the respective coefficient is a non-zero coefficient.

A context-adaptive scan order can use, for example, a topological sort to rank (e.g., in descending, ascending, or other order) the scan order positions based on a likelihood that the scan order position contains a non-zero quantized transform coefficient. The resulting scan order can then be used for a next frame's transform coefficient block coding.

Generating the context-adaptive scan order may include maintaining a correspondence between transform coefficients and corresponding context coefficients by assigning the transform coefficients context-adaptive scan order positions higher than the context coefficients, which may have lower non-zero-coefficient probabilities. The context coefficients may be included in the context-adaptive scan order based on a defined scan order, such as the zig-zag scan order, or based on recursively, or topologically, assigning the context coefficients context-adaptive scan order positions. Context-adaptive scan orders may increase the scan distance between coefficients and their context neighbors. The scan distance of a coefficient can be defined as the maximum difference between the coefficient's scan index and the scan index of the coefficients used as context for the coefficient. A maximum scan distance of a scan order can be defined as the maximum scan distance among all coefficients using that scan order.

In some implementations, a decoder may store each decoded coefficient of a block in a context coefficient register for use in decoding subsequent coefficients. The size of the context coefficient register may be a function of the size of the coefficient matrix used for coding. For example, the coefficient matrix may be an N×M matrix, such as a 32×32 matrix, encoded using a non-contiguous coding order, such as the coding order partially shown in FIG. 9, and the context coefficient register may include N*M coefficients, such as 1024 (32*32=1024) coefficients. In some implementations, each coefficient may be stored using B bits, such as 3 bits, and the size of the context coefficient register may be B*N*M bits, such as 3072 bits (1024*3 bits). The set of coefficient buffers can be referred to a line buffer.

Hardware-implemented codecs (i.e., an encoder and/or a decoder) may use a line buffer to cache decoded transform coefficients following the scan order. In coding a current coefficient of the transform coefficients, the codec fetches the transform coefficients which are used as context information for the current coefficient. To do so efficiently, it is desirable that the required context coefficients (i.e., the context coefficients) are cached in the line buffer. As such, the length of the line buffer is lower-bounded by (i.e., should have a minimum size of) the maximum scan distance of the given scan order. It is desirable to maintain a small line buffer for hardware efficiency.

Additionally, to reduce implementation costs (e.g., the cost of a hardware codec), it is desirable to limit the size of the line buffer. However, as mentioned above, context-adaptive scan orders may increase the scan distance between coefficients and their context neighbors. Other scan orders can also have large scan distances. Large scan distances, in turn, result in increased line buffer size, and hence, hardware implementation costs.

Implementations of this disclosure can generate scan orders that limit the scan distance to a maximum scan distance. The maximum scan distance can be a predetermined scan distance. For example, given a scan order, implementations of this disclosure can generate a new scan order from the scan order such that the maximum scan distance in the new scan order is bounded by a specific (e.g., predetermined) value. Accordingly, the line buffer size can be limited and hardware implementations optimized.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
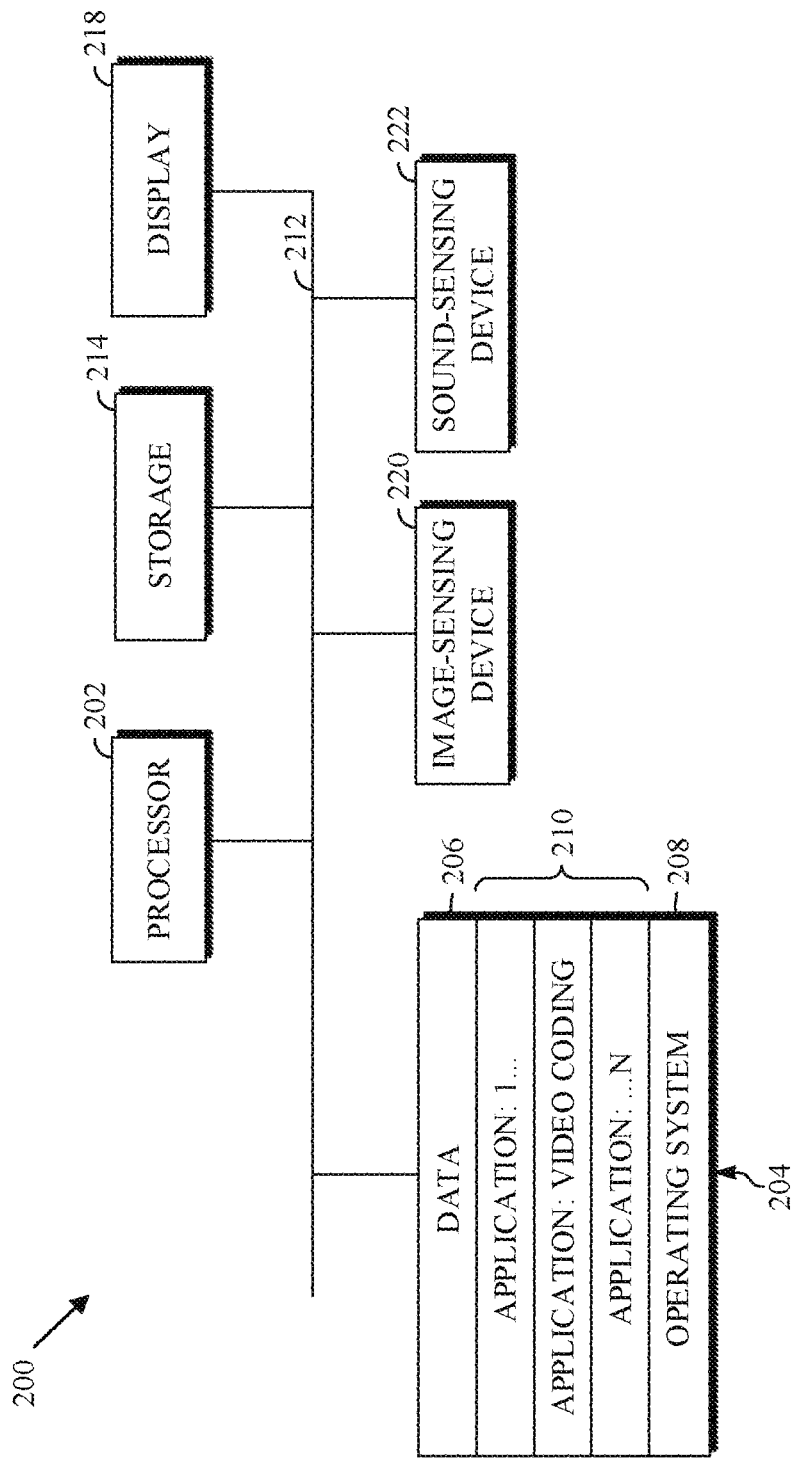
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission, at a later time, to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, for example, an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now existing or hereafter developed, capable of manipulating or processing information. Although the disclosed implementations can be practiced with a single processor as shown (e.g., the CPU 202), advantages in speed and efficiency can be achieved using more than one processor.

A memory 204 in the computing device 200 can be a read-only memory (ROM) device or a random-access memory (RAM) device in an implementation. Any other suitable type of storage device can be used as the memory 204. The memory 204 can include code and data 206 that are accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device, now existing or hereafter developed, that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device, now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted in FIG. 2 as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
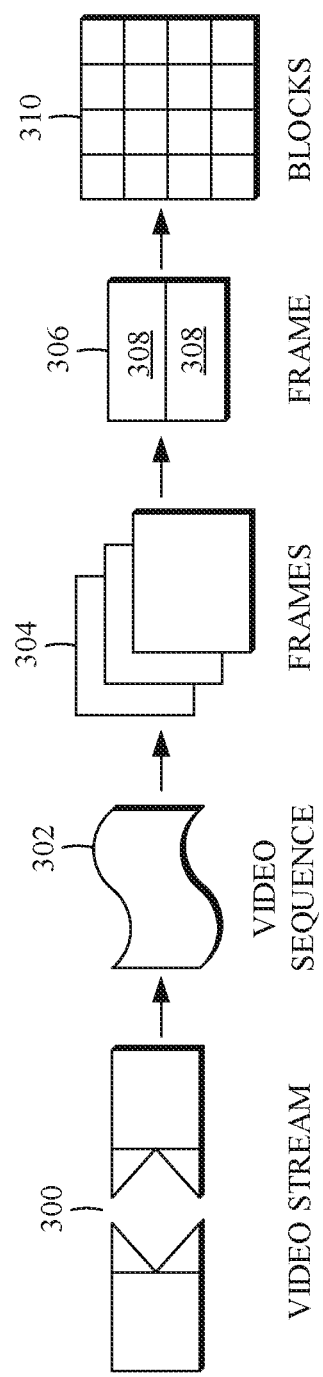
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels or larger.

Figure 4:
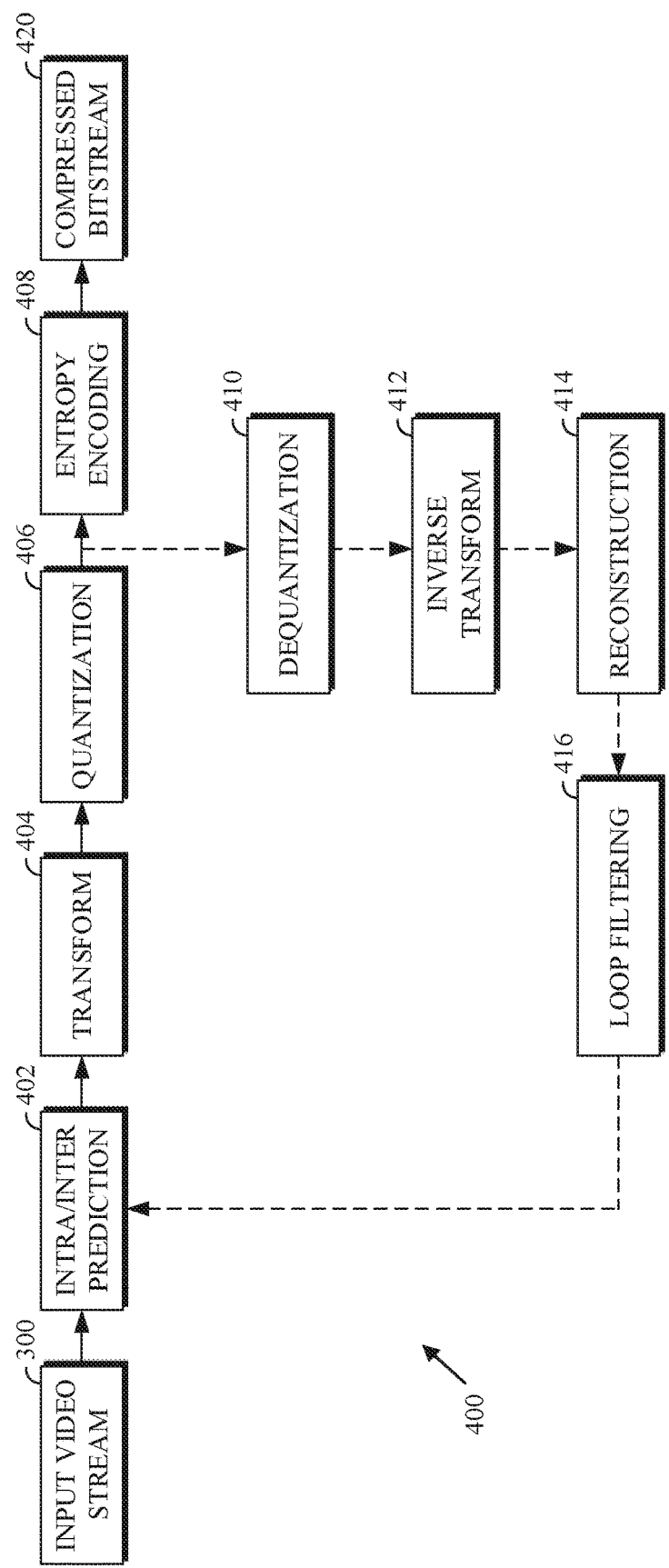
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine-readable instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of an application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors and quantizer value), are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
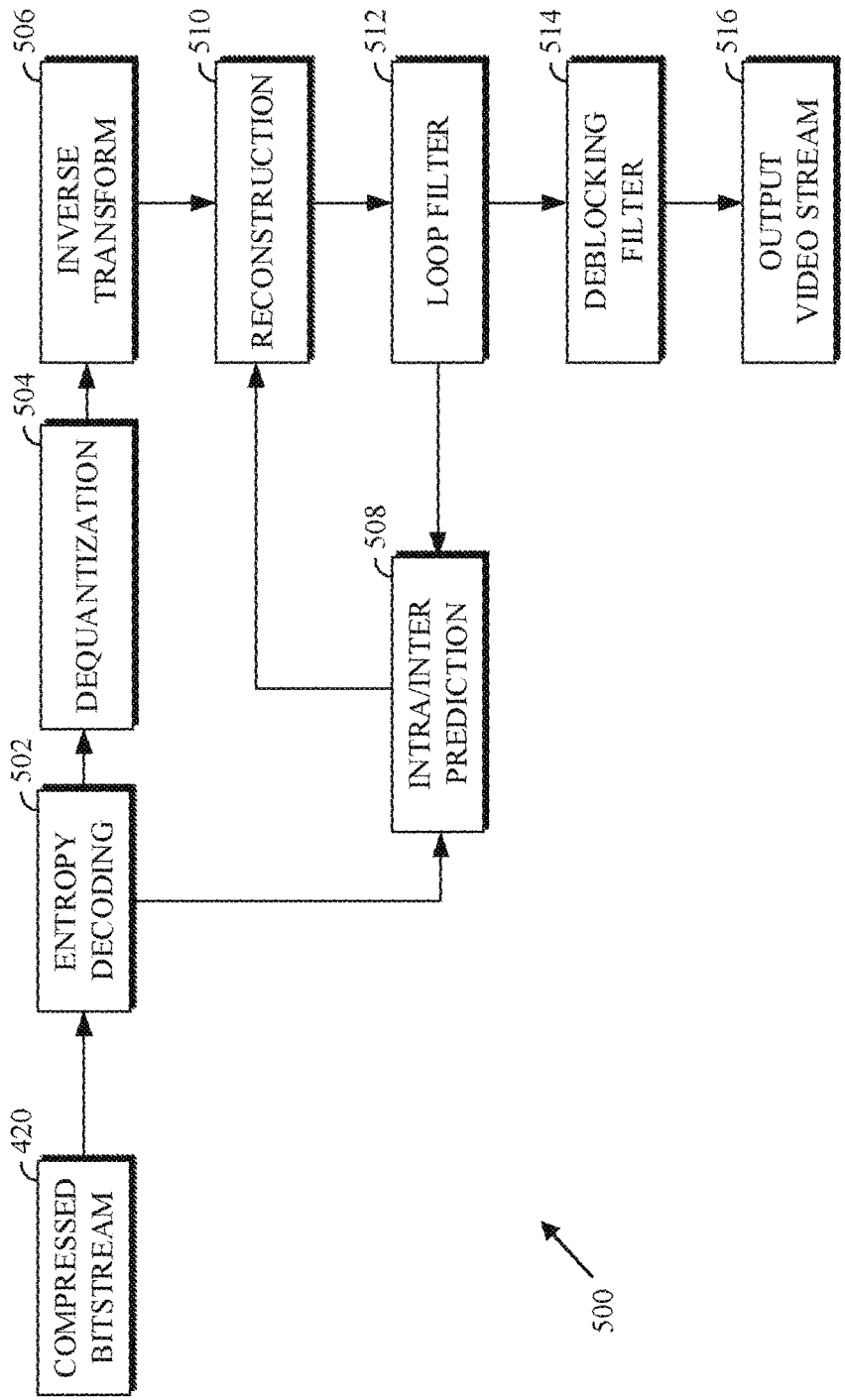
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine-readable instructions that, when executed by a processor such as the CPU 202, cause the receiving station 106 to decode video data in the manner described in FIGS. 8 and 9 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the deblocking filtering stage 514 can be applied to the reconstructed block to reduce coding artifacts, such as blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations, of the decoder 500, the deblocking filtering stage 514 is applied before the loop filtering stage 512. Additionally, or alternatively, the encoder 400 includes a deblocking filtering stage in addition to the loop filtering stage 416.

Figure 6:
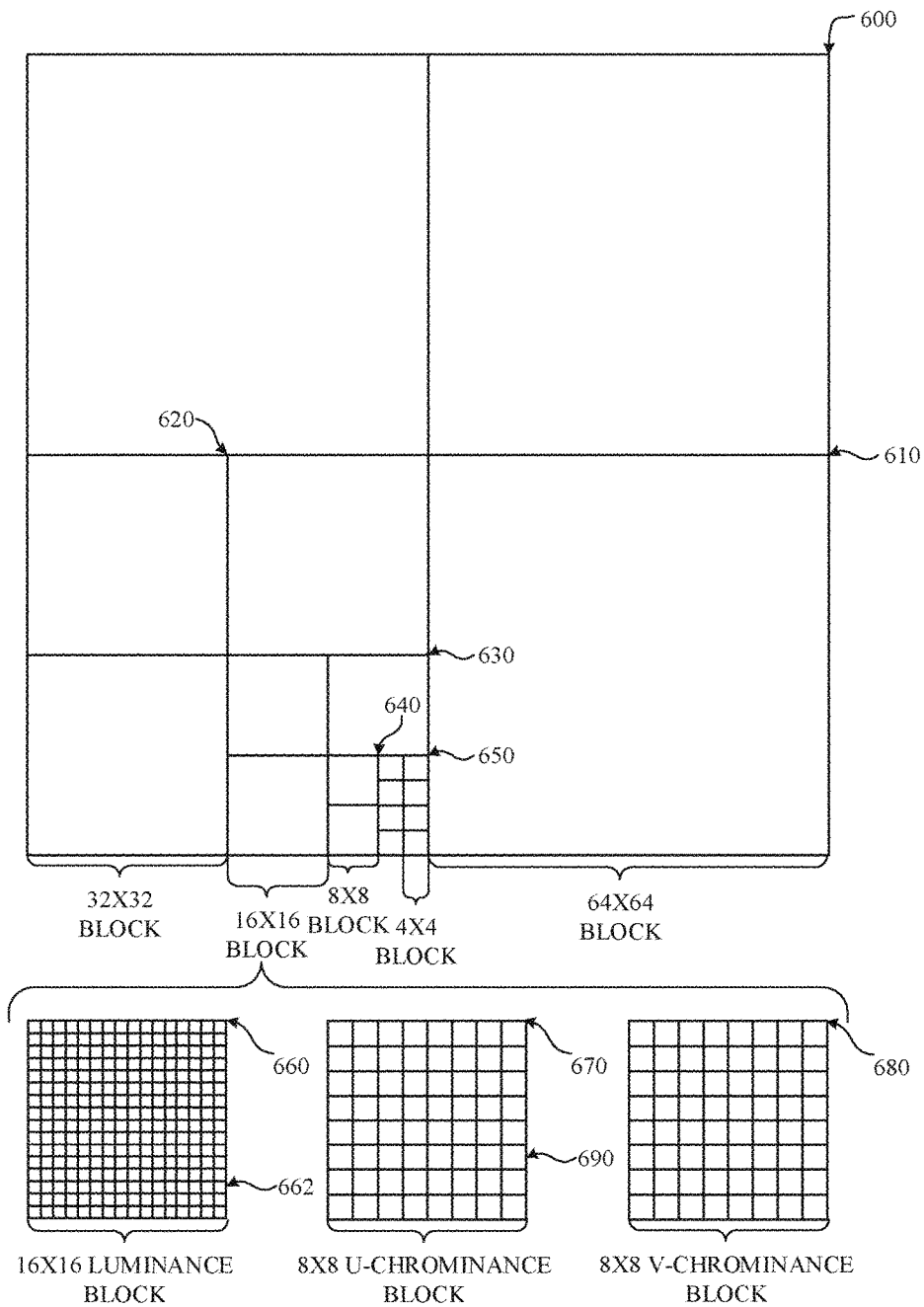
FIG. 6 is a block diagram of a representation of a portion of a frame according to implementations of this disclosure.

FIG. 6 is a block diagram of a representation of a portion 600 of a frame, such as the frame 304 shown in FIG. 3, according to implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662, and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding, wherein the top left 32×32 block may be coded, then the top right 32×32 block may be coded, then the bottom left 32×32 block may be coded, and then the bottom right 32×32 block may be coded. Each 32×32 block may be coded using quad-tree coding, wherein the top left 16×16 block may be coded, then the top right 16×16 block may be coded, then the bottom left 16×16 block may be coded, and then the bottom right 16×16 block may be coded. Each 16×16 block may be coded using quad-tree coding, wherein the top left 8×8 block may be coded, then the top right 8×8 block may be coded, then the bottom left 8×8 block may be coded, and then the bottom right 8×8 block may be coded. Each 8×8 block may be coded using quad-tree coding, wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding, wherein the top left 4×4 block may be coded, and then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform stage 404 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to a block or pixel of a reference frame at a different spatial location, and reducing temporal redundancy may include generating motion information indicating the spatial difference, or translation, between the location of the block or pixel in the current frame and the corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a predictor to use for encoding a current block or pixel of the current frame with maximal efficiency. For example, the search may identify a portion of the reference frame for which the difference in pixel values between the current block and a prediction block generated based on the portion of the reference frame is minimized, and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a predictor may include calculating a cost function, such as a sum of absolute differences (SAD), between the pixels of portions of the search area and the pixels of the current block.

In some implementations, the spatial difference between the location of the portion of the reference frame for generating a predictor in the reference frame and the current block in the current frame may be represented as a motion vector. The difference in pixel values between the predictor block and the current block may be referred to as differential data, residual data, a prediction error, or as a residual block. In some implementations, generating motion vectors may be referred to as motion estimation, and a pixel of a current block may be indicated based on its location using Cartesian coordinates, such as $f_{x,y}$. Similarly, a pixel of the search area of the reference frame may be indicated based on its location using Cartesian coordinates, such as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular-shaped prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and then selecting the best scheme, such as the scheme that produces the least rate-distortion error.

In some implementations, encoding a video frame may include identifying a prediction partitioning scheme for encoding a current block, such as the block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620, the 16×16 blocks 630, or the 8×8 blocks 640, as shown, and may include determining whether to partition a prediction partition into one or more smaller prediction partitions. For example, a 64×64 block may be partitioned into four 32×32 prediction partitions. Three of the four 32×32 prediction partitions may be encoded as 32×32 prediction partitions, and the fourth 32×32 prediction partition may be further partitioned into four 16×16 prediction partitions. Three of the four 16×16 prediction partitions may be encoded as 16×16 prediction partitions, and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4; the error metric associated with each block size may be in descending order; and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as the block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
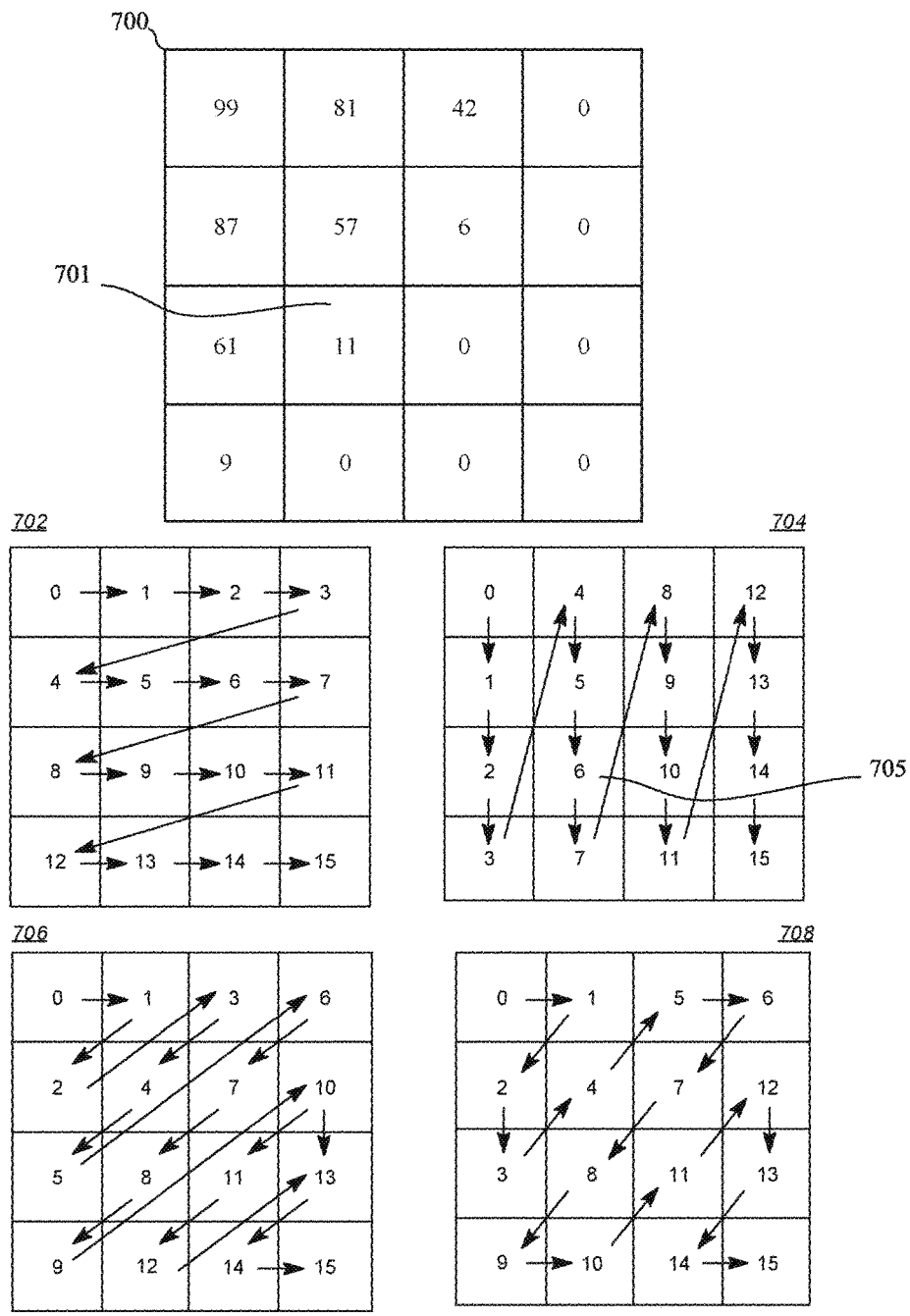
FIG. 7 shows diagrams of an example of a transform block and examples of entropy coding scan orders according to implementations of this disclosure.

FIG. 7 shows diagrams of an example of a transform block 700 and examples of entropy coding scan orders 702-708 according to implementations of this disclosure.

In some implementations, an element of an encoder, such as the transform stage 404 of the encoder 400 shown in FIG. 4, may generate the transform block 700. In some implementations, an element of an encoder, such as the quantization stage 406 of the encoder 400 shown in FIG. 4, may quantize the transform block 700 to generate a quantized transform block. As used herein, unless otherwise expressly indicated, the term "transform block" may refer to a block, matrix, or other data structure, of transform coefficients or quantized transform coefficients. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block may be used.

In the transform block 700 shown in FIG. 7, the value shown in each location indicates the transform coefficient value for the respective location. For clarity, the location of a transform coefficient for a block may be referred to as the "position," "location," or variations thereof, of the transform coefficient. As used herein references to "proximity," "spatial proximity," or "distance" between transform coefficients may indicate proximity or distance in the transform coefficient matrix representation of the transform coefficients for a block.

In some implementations, the transform block 700 may be processed in a scan order to improve entropy coding efficiency. For example, the scan order may tend to group zero value coefficients at the end of the block and consecutive zero value coefficients at the end of a block in scan order (i.e., the zero coefficient tail) may be omitted from the output bitstream without loss of data.

In some implementations, entropy coding may include encoding the coefficients of a transform block 700 in a scan order, such as a horizontal scan order 702, a vertical scan order 704, a diagonal scan order 706, or a zig-zag scan order 708. The values shown in each block of a scan order represent the order in which the corresponding coefficient is entropy coded. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In some implementations, encoding the coefficients of a transform coefficient matrix in a scan order may include generating a one-dimensional array, such as a vector, of the transform coefficients by including each transform coefficient in the vector in scan order. For example, the DC coefficient, which may be the coefficient in the top left corner of the transform coefficient matrix may be the first element of the scan order vector, may have a transform coefficient matrix location of (0,0) and may have a scan order position of (0).

As used herein, the terms "order," "scan position," "vector position," or variations thereof of a transform coefficient indicate a relative position, or index, of the transform coefficient in the scan order or the scan order vector. Although FIG. 7 shows examples of sequential scan patterns, the coefficients may be coded using a non-contiguous scan pattern.

Figure 8:
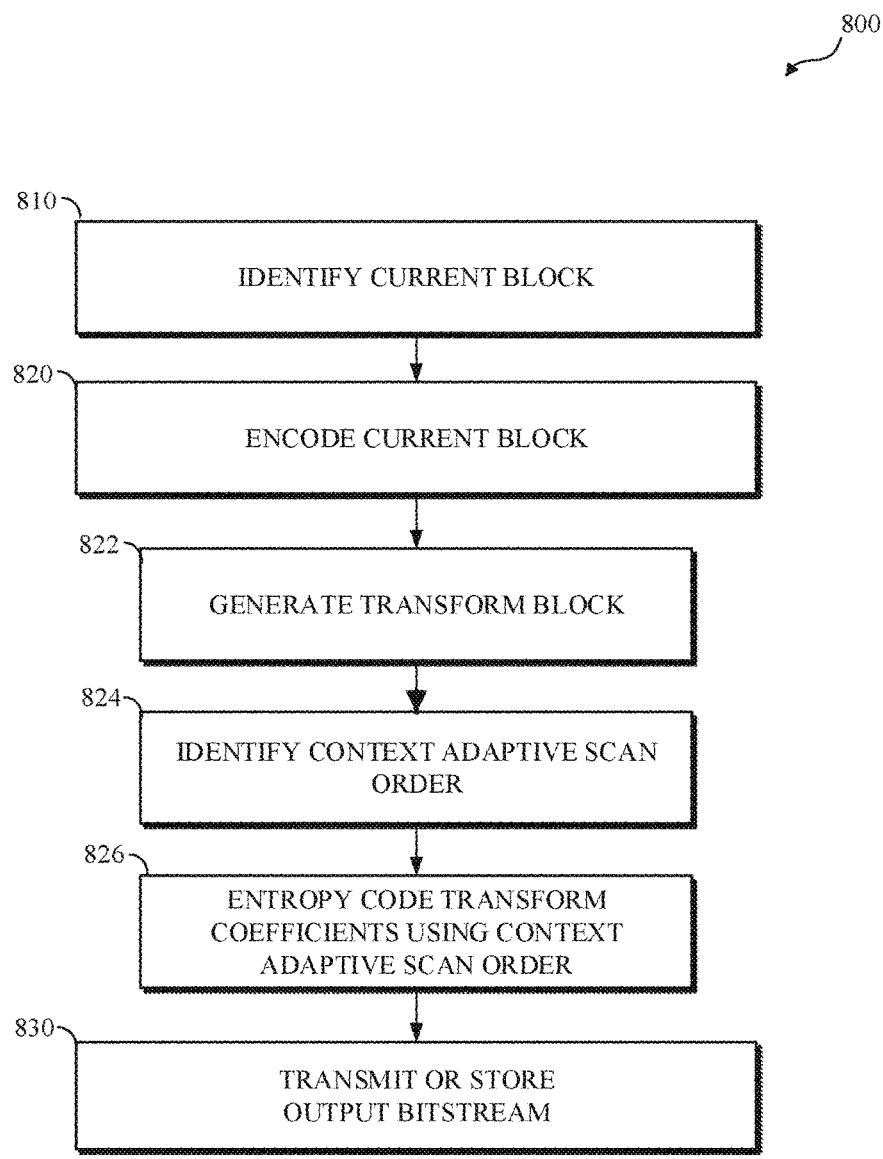
FIG. 8 is a flowchart diagram of encoding using a context-adaptive scan order for entropy coding according to implementations of this disclosure.

FIG. 8 is a flowchart diagram of encoding using a context-adaptive scan order for entropy coding according to implementations of this disclosure. In some implementations, encoding using a context-adaptive scan order for entropy coding may be implemented in an encoder, such as the encoder 400 shown in FIG. 4. For example, the entropy encoding stage 408 of the encoder 400 shown in FIG. 4 may implement encoding using a context-adaptive scan order for entropy coding. In some implementations, encoding using a context-adaptive scan order, which may be a context-constrained non-zero-probability-adaptive scan order, for entropy coding may include identifying a current block at 810, encoding the current block at 820, transmitting or storing an output bitstream at 830, or any combination thereof.

In some implementations, a current block may be identified at 810. In some implementations, the current block may be a residual block or a partition thereof. For example, the current block may be identified as a 64×64 residual block, such as the bottom-left 64×64 residual block 610 shown in FIG. 6. In another example, the current block may be identified as a sub-block of a residual block, such as the bottom left 32×32 block 620 shown in FIG. 6, the bottom left 16×16 sub-block 630 shown in FIG. 6, the bottom left 8×8 sub-block 640 shown in FIG. 6, the bottom left 4×4 sub-block 650 shown in FIG. 6, or another size block. Although not expressly shown in FIG. 8, in some implementations, identifying a current block at 810 may include identifying a current block from an input video frame, generating one or more prediction blocks for the current block, generating one or more residual blocks based on the prediction blocks, or a combination thereof, such as by the intra/inter prediction stage 402 shown in FIG. 4.

In some embodiments, the current block may be encoded at 820. For example, the current block may be encoded by an encoder, such as the encoder 400 shown in FIG. 4, which may include generating a transform block at 822 by transforming the residual, or a portion thereof, such as by the transform stage 404 shown in FIG. 4; identifying a scan order at 824; entropy coding the transform block (or the quantized transform block) at 826; or a combination thereof.

In some implementations, a transform block may be generated at 822. In some implementations, generating a transform block at 822 may include partitioning the current residual block into one or more transform partitions, which may be rectangular, including square, partitions for transform coding. In some implementations, video coding using transform partitioning may include selecting a uniform transform partitioning scheme or a multiform transform partitioning scheme, as shown in FIG. 6. In some implementations, generating a transform block at 822 may include transforming the residual block, or residual block partition, into transform coefficients, such as by a transform unit, such as the transform stage 404 shown in FIG. 4. Although not expressly shown in FIG. 8, in some implementations, a quantized transform block may be generated by quantizing the transform block, such as by the quantization stage 406 shown in FIG. 4.

Figure 9:
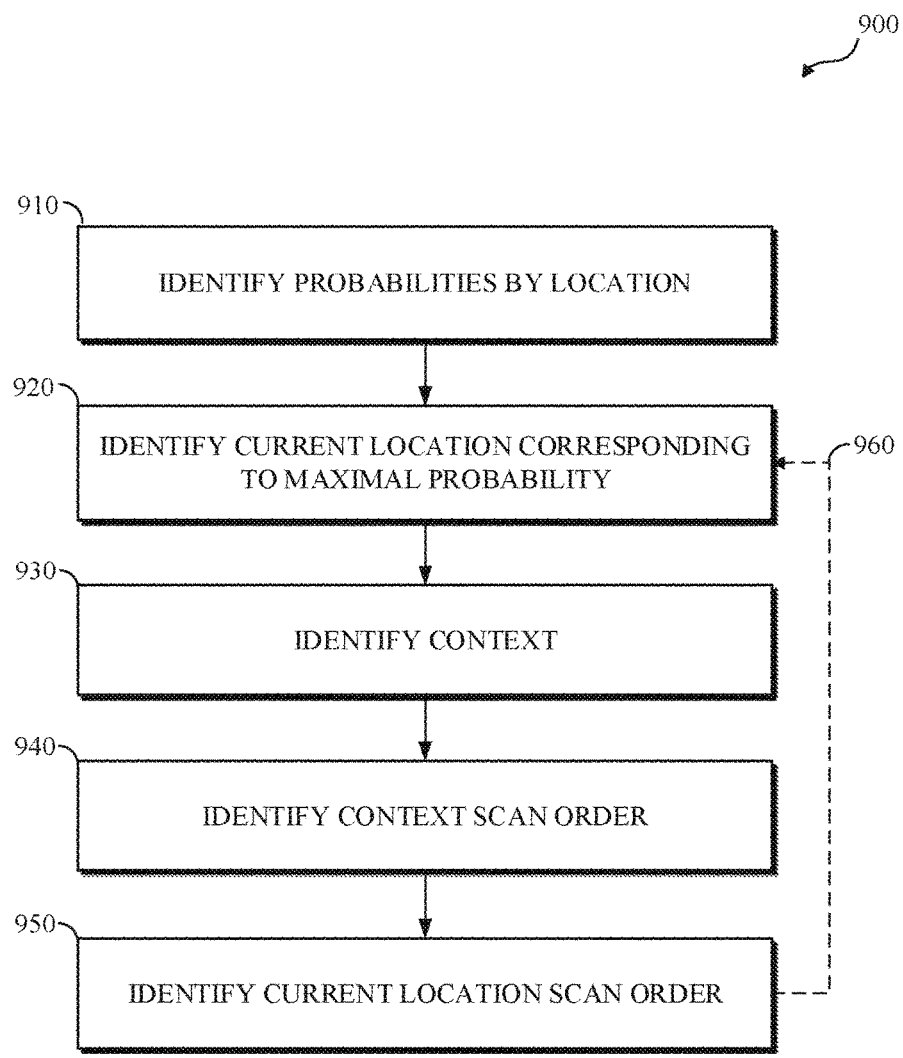
FIG. 9 is a flowchart diagram of identifying a context-adaptive scan order for entropy coding according to implementations of this disclosure.

In some implementations, a scan order, such as a context-adaptive scan order, may be identified at 824, for entropy coding the transform block, or quantized transform block, identified at 822. In some implementations, identifying a context-adaptive scan order at 824 may include identifying a scan order based on non-zero-coefficient probabilities with context preservation, as shown in FIG. 9. In some implementations, the identified scan order may indicate a scan pattern, a direction within the scan pattern, or both.

In some implementations, the transform block (or the quantized transform block) may be entropy coded at 826 based on the context-adaptive scan order identified at 824. For example, entropy coding the transform block may include sequentially encoding the transform coefficients from the transform block in the context-adaptive scan order identified at 824, including the entropy coded transform coefficient in an encoded output data stream, such as the compressed bitstream 420 shown in FIG. 4, or a combination thereof. In some implementations, a current transform coefficient may be a zero value transform coefficient, the current block of transform coefficients may not include a subsequent non-zero value transform coefficient, and entropy coding for the current block may be complete.

In some implementations, the output bitstream may be transmitted or stored at 830. For example, the output may be transmitted as a signal via a network, such as the network 104 shown in FIG. 1, such that a device, such as the computing device 200 shown in FIG. 2 or the transmitting station 102 or the receiving station 106 of FIG. 1, which may include a decoder, such as the decoder 500 shown in FIG. 5, may receive the signal via the network, may decode the encoded video bitstream, and may generate a reconstructed frame, or a portion of a reconstructed frame, corresponding to the current frame. In another example, the encoded video bitstream may be stored in a memory, such as the memory 204 shown in FIG. 2, of a device, such as the computing device 200 shown in FIG. 2 or the transmitting station 102 or the receiving station 106 of FIG. 1, as a stored encoded video, such that the device, or any other device capable of accessing the memory, may retrieve the stored encoded video, such that a decoder, such as the decoder 500 shown in FIG. 5, may decode the encoded video, and may generate a reconstructed frame, or a portion of a reconstructed frame, corresponding to the current frame.

Other implementations of encoding using a context-adaptive scan order for entropy coding as shown in FIG. 8 are available. In implementations, additional elements of encoding using a context-adaptive scan order for entropy coding can be added, certain elements can be combined, and/or certain elements can be removed.

FIG. 9 is a flowchart diagram of identifying a context-adaptive scan order for entropy coding 900 according to implementations of this disclosure. In some implementations, encoding a transform block, such as the encoding shown at 820 in FIG. 8, may include identifying an unencoded current transform coefficient from the transform block based on a context-adaptive scan order, identifying an entropy coding probability distribution for the current transform coefficient, representing the current transform coefficient as a code based on the entropy coding probability distribution, including the code in an encoded output data stream, or a combination thereof. In some implementations, the entropy coding probability distributions may be based on estimated probabilities, calculated probabilities, or a combination of estimated and calculated probabilities, that the symbols will appear in the input data stream, and may be ordered so that the shortest codes may be associated with the most frequently appearing symbols (coefficients).

In some implementations, identifying a context-adaptive scan order for entropy coding 900 may be implemented in an encoder, such as the encoder 400 shown in FIG. 4. For example, the entropy encoding stage 408 of the encoder 400 shown in FIG. 4 may identify a context-adaptive scan order for entropy coding. In some implementations, identifying a context-adaptive scan order for entropy coding at 900 in FIG. 9 may be similar to the identifying a context-adaptive scan order for entropy coding as shown at 824 in FIG. 8. In some implementations, identifying a context-adaptive scan order for entropy coding 900 may include identifying transform coefficient probabilities at 910, identifying a current transform coefficient location at 920, identifying context locations at 930, identifying a context location scan order at 940, identifying a current location scan order at 950, or any combination thereof.

In some implementations, transform coefficient probabilities may be identified at 910. The transform coefficient probabilities, or non-zero-coefficient probabilities, may indicate, for each location or position in the transform block, a respective probability that the corresponding transform coefficient is a non-zero coefficient. In some implementations, the current transform coefficient may be a zero value transform coefficient, the current block of transform coefficients may not include a subsequent non-zero value transform coefficient, and entropy coding for the current block may be complete.

In some implementations, identifying the non-zero-coefficient probabilities at 910 may include generating, maintaining, tracking, or a combination thereof, statistics indicating probabilities for respective locations in the transform block that the location includes a non-zero-coefficient. For example, the non-zero-coefficient probabilities for a current block may be updated non-zero-coefficient probabilities, which may be the non-zero-coefficient probabilities used for encoding a previously coded block updated based on non-zero-coefficient counts for the previously coded block.

In some implementations, the transform coefficient probabilities may be identified at 910 based on one or more previously coded frames, estimated probabilities for the current frame, or a combination thereof. In some implementations, for a previously coded frame (the i-th frame), (r) may indicate a frequency index in the vertical direction, which may correspond to a row number in the transform coefficient matrix, (c) may indicate a frequency index in the horizontal direction, which may correspond with a column number in the transform coefficient matrix, and a count of non-zero coefficients C[i][r][c] may be determined for each position, or location, (r, c) in the transformed block. The count of non-zero coefficients for a respective transform coefficient location C[i][r][c] may be determined for each transformed block in the frame, which may be indicated by a transform block number (M). The transform block number (M) may indicate a number, or cardinality, of transform blocks of a defined size in a frame. In some implementations, a frame may include two or more transform block sizes. For each block size (t) a cardinality M of t-size transform blocks for the frame may be indicated (M(t)), and the count of non-zero coefficients for respective transform coefficient location C[t][i][r][c] may be determined.

The observed probability Pc[i][r][c] of non-zero coefficient at each location of the respective transformed blocks (M) in the previously coded frame (i) may be determined by dividing the count of non-zero coefficients for the respective transform coefficient location C[i][r][c] by the transform block number (M), which may be expressed as Pc[i][r][c]=C[i][r][c]/M. In some implementations, estimated probabilities Pe[i][r][c] of non-zero coefficient at each location in respective transformed blocks of the previously coded frame (i) may be identified. The estimated probabilities Pe[i][r][c] may indicate probabilities generated for encoding the previously coded frame.

In some implementations, (a) may indicate an update rate, and non-zero probabilities Pe[i+1][r][c] for transform blocks of a current frame (i+1) may be estimated based on a combination of the estimated probabilities Pe[i][r][c] of non-zero coefficient of the previously coded frame (i) and the observed probability Pc[i][r][c] of non-zero coefficient for the previously coded frame (i), which may be expressed as Pe[i+1][r][c]=(1−a)*Pe[i][r][c]+a*Pc[i][r][c].

In some implementations, a current transform coefficient location may be identified at 920. Identifying the current transform coefficient location may include identifying a maximal non-zero-coefficient probability from the transform coefficient probabilities identified at 910. For example, the maximal non-zero-coefficient probability may be the probability among the transform coefficient probabilities identified at 910 having the highest value, which may correspond to the location in the transform block that is most likely to include a non-zero-coefficient.

In some implementations, identifying the current transform coefficient location at 920 may include identifying the maximal unassigned transform coefficient location from the transform block and omitting transform coefficient locations having assigned positions in the context-adaptive scan order from the identification of the current transform coefficient location. In some implementations, identifying a context-adaptive scan order for entropy coding 900 may include identifying a current transform coefficient location at 920, identifying context locations at 930, identifying a context location scan order at 940, identifying a current location scan order at 950, or a combination thereof, for each location in the current block sequentially or iteratively as indicated by the broken line at 960.

For example, identifying a current transform coefficient location may include sorting the estimated non-zero probabilities for the current transform block Pe[i+1][r][c], and selecting the current transform coefficient location in the sorted order.

In some implementations, an entropy coding probability distribution for entropy coding a current transform coefficient may be identified or adapted based on one or more entropy coding context locations, such as one or more previously coded transform coefficients for the current block.

In some implementations, entropy coding context locations may be identified at 930. In some implementations, the entropy coding context locations may include previously entropy coded coefficients from the current block that are spatially proximate to the current coefficient. In some implementations, the spatially proximate entropy coding context locations may be identified based on a scan order, which may differ from the context-adaptive scan order. For example, the spatially proximate entropy coding context locations may be identified based on a raster scan order, such as the horizontal scan order 702 shown in FIG. 7. For example, the entropy coding context locations may include previously entropy coded transform coefficients that are spatially proximate to the current coefficient in the current block of transform coefficients, such as the coefficient immediately to the left of the current coefficient, the coefficient immediately above the current coefficient, or the coefficient immediately above and to the left of the current coefficient.

In some implementations, the entropy coding context locations for entropy coding a current transform coefficient may include coefficients adjacent to the current coefficient, and may include entropy coding context locations of the coefficients adjacent to the current coefficient. For example, the entropy coding context locations for the coefficient labeled 6 in the horizontal scan order 702 of FIG. 7 may include the coefficients labeled 1, 2, and 5, and the entropy coding context locations for the coefficient labeled 11 in the horizontal scan order 702 of FIG. 7 may include the coefficients labeled 1, 2, 3, 5, 6, 7, 9, and 10.

In some implementations, an entropy coding context location scan order may be identified at 940. In some implementations, the context-adaptive scan order may include an assigned scan order for one or more of the entropy coding context locations identified at 930 (assigned entropy coding context locations), and the entropy coding context location scan order from the context-adaptive scan order for the entropy coding context locations having an assigned scan order in the context-adaptive scan order may be identified as the entropy coding context location scan order at 940. In some implementations, the context-adaptive scan order may omit an assigned scan order for one or more of the entropy coding context locations identified at 930 (unassigned entropy coding context locations), and identifying the entropy coding context location scan order at 940 may include sorting the unassigned entropy coding context locations, using a defined scan order, such as the zig-zag scan order, or topologically sorting the unassigned entropy coding context locations.

In some implementations, a scan order position in the context-adaptive scan order for the current location may be identified at 950. For example, the minimal unassigned scan order position in the context-adaptive scan order, which may be greater than the respective assigned scan order positions identified at 940 for the entropy coding context locations identified at 930, may be identified at 950 as the assigned scan order position in the context-adaptive scan order for the current location identified at 920.

In some implementations, identifying the context-adaptive scan order may include using the following as input: (len) may indicate a length or size of the current transform block, such as 4 for a 4×4 block or 8 for an 8×8 block; (ci) may indicate a coefficient index corresponding to a location (r, c), which may be expressed as ci=r*len+c; (N) may indicate the number or cardinality of coefficient locations in the transform block, which may be expressed as N=len*len for a square (len×len) block; scan[si] may indicate correlation between scan order (si) and coefficient index (ci), such as a map from scan order (si) to coefficient index (ci); dep[ci] may indicate a list of coefficient indexes for entropy coding context locations of the current coefficient with index ci; visit[ci] may indicate a table, or other data storage structure, that may indicate whether the coefficient with index ci is a previously scanned and coded coefficient. In some implementations, floor( ) may be a function mapping a real number to a largest previous integer, and a location (r, c) for a coefficient index ci may be expressed as r=floor(ci/len), c=ci modulo (%) len.

In some implementations, identifying the context-adaptive scan order may include generating the following output: new_scan[si], which may indicate an updated or modified correlation between scan order (si) and coefficient index (ci), such as an updated map from scan order (si) to coefficient index (ci). For example, in a 4×4 square transform block, identifying the coefficient index ci for the fourth scanned coefficient, which may be scan order 3, may be expressed as ci=new_scan[3]. For example, the coefficient index ci for the fourth scanned coefficient may be seven (ci=new_scan[3]=7), and the coefficient with coefficient index five (ci=5) may be scanned fourth. A location (r, c) for the coefficient with coefficient index seven may be identified based on the corresponding coefficient index ci (ci=7), which may be expressed as r=floor(7/4)=1 and c=7%4=3, which may indicate that the coefficient at the second row and the fourth column may be scanned fourth. Generating new_scan[si] may be expressed as shown in the following:

```
modify_scan_order(scan, dep)
    new_scan = [ ]
    for ci = 0 to N-1
        visit[ci] = 0
    for si = 0 to N-1
        ci = scan[si]
        topological_sort(ci, dep, new_scan, visit)
    return new_scan
topological_sort(ci, dep, new_scan, visit)
    for nb_ci in dep[ci]
        if visit[nb] == 0
            topological_sort(nb_ci, dep, new_scan)
    new_scan.push(ci)
    visit[ci] = 1
```

Figure 10:
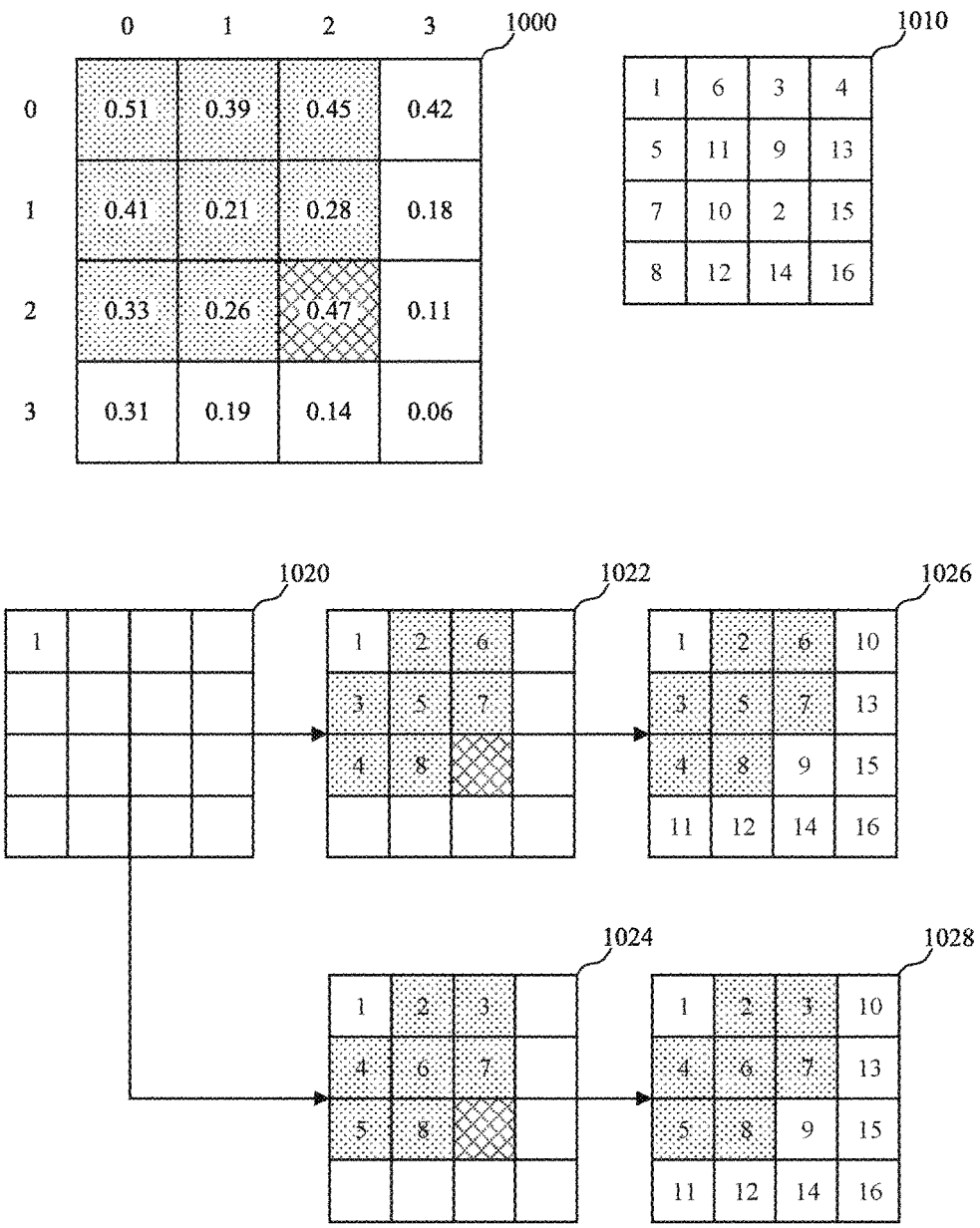
FIG. 10 shows diagrams of an example of an estimated non-zero-coefficient probability matrix for a transform block, an example of a corresponding magnitude-based scan order, and examples of corresponding context-adaptive scan orders according to implementations of this disclosure.

FIG. 10 shows diagrams of an example of an estimated non-zero-coefficient probability matrix 1000 for a transform block, an example of a corresponding magnitude-based scan order 1010, and examples of corresponding context-adaptive scan orders 1020-1028 according to implementations of this disclosure.

In some implementations, the estimated non-zero-coefficient probability matrix 1000 may be an estimated non-zero-coefficient probability matrix. For example, the estimated non-zero-coefficient probability matrix 1000 may be an estimated non-zero-coefficient probability matrix identified as shown at 910 in FIG. 9. As shown in FIG. 10, the estimated non-zero-coefficient probability matrix 1000 indicates, for each coefficient location in a transform block, an estimated probability that the corresponding coefficient in a transform block has a non-zero value. For clarity, the location of the transform coefficients, and the corresponding estimated probabilities, may be referenced using Cartesian coordinates.

In the example shown in FIG. 10, the estimated non-zero-coefficient probability matrix 1000 indicates that:
  a. the estimated probability that the transform coefficient at the top-left location (0, 0) in the corresponding transform block is the highest estimated non-zero-coefficient probability (0.51) for the transform block;
  b. the estimated probability that the transform coefficient at the third row and third column (2, 2) in the corresponding transform block is the second highest estimated non-zero-coefficient probability (0.47) for the transform block;
  c. the estimated probability that the transform coefficient at the first row and third column (0, 2) in the corresponding transform block is the third highest estimated non-zero-coefficient probability (0.45) for the transform block;
  d. the estimated probability that the transform coefficient at the first row and fourth column (0, 3) in the corresponding transform block is the fourth highest estimated non-zero-coefficient probability (0.42) for the transform block;
  e. the estimated probability that the transform coefficient at the second row and first column (1, 0) in the corresponding transform block is the fifth highest estimated non-zero-coefficient probability (0.41) for the transform block;
  f. the estimated probability that the transform coefficient at the first row and second column (0, 1) in the corresponding transform block is the sixth highest estimated non-zero-coefficient probability (0.39) for the transform block;
  g. the estimated probability that the transform coefficient at the third row and first column (2, 0) in the corresponding transform block is the seventh highest estimated non-zero-coefficient probability (0.33) for the transform block;
  h. the estimated probability that the transform coefficient at the fourth row and first column (3, 0) in the corresponding transform block is the eighth highest estimated non-zero-coefficient probability (0.31) for the transform block;
  i. the estimated probability that the transform coefficient at the second row and third column (1, 2) in the corresponding transform block is the ninth highest estimated non-zero-coefficient probability (0.28) for the transform block;
  j. the estimated probability that the transform coefficient at the third row and second column (2, 1) in the corresponding transform block is the tenth highest estimated non-zero-coefficient probability (0.26) for the transform block;
  k. the estimated probability that the transform coefficient at the second row and second column (1, 1) in the corresponding transform block is the eleventh highest estimated non-zero-coefficient probability (0.21) for the transform block;
  l. the estimated probability that the transform coefficient at the fourth row and second column (3, 1) in the corresponding transform block is the twelfth highest estimated non-zero-coefficient probability (0.19) for the transform block;
  m. the estimated probability that the transform coefficient at the second row and fourth column (1, 3) in the corresponding transform block is the thirteenth highest estimated non-zero-coefficient probability (0.18) for the transform block;
  n. the estimated probability that the transform coefficient at the fourth row and third column (3, 2) in the corresponding transform block is the fourteenth highest estimated non-zero-coefficient probability (0.14) for the transform block;
  o. the estimated probability that the transform coefficient at the third row and fourth column (2, 3) in the corresponding transform block is the fifteenth highest estimated non-zero-coefficient probability (0.11) for the transform block; and that
  p. the estimated probability that the transform coefficient at the bottom-right location (3, 3) in the corresponding transform block is the lowest estimated non-zero-coefficient probability (0.06) for the transform block.

In some implementations, an entropy coding scan order may be identified based on the magnitude of the estimated non-zero-coefficient probabilities in the estimated non-zero-coefficient probability matrix 1000, such as in order from greatest, highest, or maximal estimated non-zero-coefficient probability to least, lowest, or minimal estimated non-zero-coefficient probability, as shown at the magnitude-ordered entropy coding scan order 1010.

For example, in the estimated non-zero-coefficient probability matrix 1000 the estimated probability that the transform coefficient at the top-left location (0, 0) in the corresponding transform block is the highest estimated non-zero-coefficient probability (0.51) for the transform block, and the minimal or lowest (1) unassigned entropy coding scan order position may be identified as, or assigned as, the entropy coding scan order position for the entropy coding context location at the top-left location (0, 0), as shown at the top-left location (0, 0) of the magnitude-ordered entropy coding scan order 1010.

The estimated probability that the transform coefficient at the third row and third column (2, 2) in the corresponding transform block is the second highest estimated non-zero-coefficient probability (0.47) for the transform block, and the second lowest (2) unassigned entropy coding scan order position may be identified as, or assigned as, the entropy coding scan order position for the entropy coding context location at the third row and third column (2, 2), as shown in the third row and third column (2, 2) of the magnitude-ordered entropy coding scan order 1010. The estimated probability that the transform coefficient at the first row and third column (0, 2) in the corresponding transform block is the third highest estimated non-zero-coefficient probability (0.45) for the transform block, and the third lowest (3) unassigned entropy coding scan order position may be identified as, or assigned as, the entropy coding scan order position for the entropy coding context location at the first row and third column (0, 2), as shown in the first row and third column (0, 2) of the magnitude-ordered entropy coding scan order 1010.

The estimated probability that the transform coefficient at the first row and fourth column (0, 3) in the corresponding transform block is the fourth highest estimated non-zero-coefficient probability (0.42) for the transform block, and the fourth lowest (4) unassigned entropy coding scan order position may be identified as, or assigned as, the entropy coding scan order position for the entropy coding context location at the first row and fourth column (0, 3) as shown in the first row and fourth column (0, 3) of the magnitude-ordered entropy coding scan order 1010. The estimated probability that the transform coefficient at the second row and first column (1, 0) in the corresponding transform block is the fifth highest estimated non-zero-coefficient probability (0.41) for the transform block, and the fifth lowest (5) unassigned entropy coding scan order position may be identified as, or assigned as, the entropy coding scan order position for the entropy coding context location at the second row and first column (1, 0) as shown in the second row and first column (1, 0) of the magnitude-ordered entropy coding scan order 1010.

The estimated probability that the transform coefficient at the first row and second column (0, 1) in the corresponding transform block is the sixth highest estimated non-zero-coefficient probability (0.39) for the transform block, and the sixth lowest (6) unassigned entropy coding scan order position may be identified as, or assigned as, the entropy coding scan order position for the entropy coding context location at the first row and second column (0, 1), as shown in the first row and second column (0, 1) of the magnitude-ordered entropy coding scan order 1010. The estimated probability that the transform coefficient at the third row and first column (2, 0) in the corresponding transform block is the seventh highest estimated non-zero-coefficient probability (0.33) for the transform block, and the seventh lowest (7) unassigned entropy coding scan order position may be identified as, or assigned as, the entropy coding scan order position for the entropy coding context location at the third row and first column (2, 0), as shown in the third row and first column (2, 0) of the magnitude-ordered entropy coding scan order 1010.

The estimated probability that the transform coefficient at the fourth row and first column (3, 0) in the corresponding transform block is the eighth highest estimated non-zero-coefficient probability (0.31) for the transform block, and the eighth lowest (8) unassigned entropy coding scan order position may be identified as, or assigned as, the entropy coding scan order position for the entropy coding context location at the fourth row and first column (3, 0), as shown in the fourth row and first column (3, 0) of the magnitude-ordered entropy coding scan order 1010. The estimated probability that the transform coefficient at the second row and third column (1, 2) in the corresponding transform block is the ninth highest estimated non-zero-coefficient probability (0.28) for the transform block, and the ninth lowest (9) unassigned entropy coding scan order position may be identified as, or assigned as, the entropy coding scan order position for the entropy coding context location at the second row and third column (1, 2), as shown in the second row and third column (1, 2) of the magnitude-ordered entropy coding scan order 1010.

The estimated probability that the transform coefficient at the third row and second column (2, 1) in the corresponding transform block is the tenth highest estimated non-zero-coefficient probability (0.26) for the transform block, and the tenth lowest (10) unassigned entropy coding scan order position may be identified as, or assigned as, the entropy coding scan order position for the entropy coding context location at the third row and second column (2, 1), as shown in the third row and second column (2, 1) of the magnitude-ordered entropy coding scan order 1010. The estimated probability that the transform coefficient at the second row and second column (1, 1) in the corresponding transform block is the eleventh highest estimated non-zero-coefficient probability (0.21) for the transform block, and the eleventh lowest (11) unassigned entropy coding scan order position may be identified as, or assigned as, the entropy coding scan order position for the entropy coding context location at the second row and second column (1, 1), as shown in the second row and second column (1, 1) of the magnitude-ordered entropy coding scan order 1010.

The estimated probability that the transform coefficient at the fourth row and second column (3, 1) in the corresponding transform block is the twelfth highest estimated non-zero-coefficient probability (0.19) for the transform block, and the twelfth lowest (12) unassigned entropy coding scan order position may be identified as, or assigned as, the entropy coding scan order position for the entropy coding context location at the fourth row and second column (3, 1), as shown in the fourth row and second column (3, 1) of the magnitude-ordered entropy coding scan order 1010. The estimated probability that the transform coefficient at the second row and fourth column (1, 3) in the corresponding transform block is the thirteenth highest estimated non-zero-coefficient probability (0.18) for the transform block, and the thirteenth lowest (13) unassigned entropy coding scan order position may be identified as, or assigned as, the entropy coding scan order position for the entropy coding context location at the second row and fourth column (1, 3), as shown in the second row and fourth column (1, 3) of the magnitude-ordered entropy coding scan order 1010.

The estimated probability that the transform coefficient at the fourth row and third column (3, 2) in the corresponding transform block is the fourteenth highest estimated non-zero-coefficient probability (0.14) for the transform block, and the fourteenth lowest (14) unassigned entropy coding scan order position may be identified as, or assigned as, the entropy coding scan order position for the entropy coding context location at the fourth row and third column (3, 2), as shown in the fourth row and third column (3, 2) of the magnitude-ordered entropy coding scan order 1010. The estimated probability that the transform coefficient at the third row and fourth column (2, 3) in the corresponding transform block is the fifteenth highest estimated non-zero-coefficient probability (0.11) for the transform block, and the fifteenth lowest (15) unassigned entropy coding scan order position may be identified as, or assigned as, the entropy coding scan order position for the entropy coding context location at the third row and fourth column (2, 3), as shown in the third row and fourth column (2, 3) of the magnitude-ordered entropy coding scan order 1010.

The estimated probability that the transform coefficient at the bottom-right location (3, 3) in the corresponding transform block is the lowest estimated non-zero-coefficient probability (0.06) for the transform block, and the highest or maximal (16) unassigned entropy coding scan order position may be identified as, or assigned as, the entropy coding scan order position for the entropy coding context location at the bottom-right location (3, 3), as shown at the bottom-right location (3, 3) of the magnitude-ordered entropy coding scan order 1010.

In some implementations, a context-adaptive scan order may be identified based on the magnitude of the estimated non-zero-coefficient probabilities in the estimated non-zero-coefficient probability matrix 1000 and context ordering as shown by the context-adaptive scan orders 1020-1028.

For example, in the estimated non-zero-coefficient probability matrix 1000, the estimated probability that the transform coefficient at the top-left location (0, 0) in the corresponding transform block is the highest estimated non-zero-coefficient probability (0.51) for the transform block, and the minimal or lowest (1) unassigned context-adaptive scan order position may be identified as, or assigned as, the context-adaptive scan order position for the entropy coding context location at the top-left location (0, 0), as shown at the top-left location (0, 0) of the first context-adaptive scan order 1020.

In the estimated non-zero-coefficient probability matrix 1000 the estimated probability that the transform coefficient at the third row and third column (2, 2) in the corresponding transform block is the second highest estimated non-zero-coefficient probability (0.47) for the transform block, and the non-zero-coefficient probability location at the third row and third column (2, 2) is shown with cross-hatching to indicate that, with respect to the first context-adaptive scan order 1020, the non-zero-coefficient probability location at the third row and third column (2, 2) is the current non-zero-coefficient probability location.

In some implementations, entropy coding context locations may be identified for the current non-zero-coefficient probability location. For example, entropy coding context locations may be identified for the current non-zero-coefficient probability location as indicated at 920 in FIG. 9. In some implementations, the entropy coding context locations may be identified based on a defined context selection scheme. For example, in the estimated non-zero-coefficient probability matrix 1000 shown in FIG. 10, the locations—(0, 0), (0, 1), (0, 2), (1, 0), (1, 1), (1, 2), (2, 0), and (2, 1)—above, to the left of, and above and to the left of the current non-zero-coefficient probability location (2, 2) may be identified as entropy coding context coefficients for the current non-zero-coefficient probability location (2, 2), as indicated by the stippled background in the estimated non-zero-coefficient probability matrix 1000.

In some implementations, the context-adaptive scan order may include assigned context-adaptive scan order positions for one or more of the entropy coding context locations. For example, the first context-adaptive scan order 1020 includes an assigned context-adaptive scan order position (1) for the top-left entropy coding context location (0, 0).

In some implementations, the context-adaptive scan order may omit assigned context-adaptive scan order positions for one or more of the entropy coding context locations. For example, the first context-adaptive scan order 1020 omits assigned context-adaptive scan order positions for the entropy coding context locations—(0, 1), (0, 2), (1, 0), (1, 1), (1, 2), (2, 0), and (2, 1)—other than the top-left entropy coding context location (0, 0). For simplicity, the entropy coding context locations for which the context-adaptive scan order omits assigned context-adaptive scan order positions may be referred to as unassigned entropy coding context locations.

In some implementations, assigned context-adaptive scan order positions may be identified for the unassigned entropy coding context locations. For example, assigned context-adaptive scan order positions may be identified for the unassigned entropy coding context locations as shown at 940 in FIG. 9. In some implementations, the assigned context-adaptive scan order positions may be identified for the unassigned entropy coding context locations, which may be a set of unassigned entropy coding context locations, based on a defined scan order or based on topologically, or recursively, sorting the unassigned entropy coding context locations.

In FIG. 10, the second context-adaptive scan order 1022 includes assigned context-adaptive scan order positions for the entropy coding context locations identified for the current non-zero-coefficient probability location. The location indicated with the cross-hatched background in the second context-adaptive scan order 1022 corresponds with the current non-zero-coefficient probability location (2, 2). The top-left entropy coding context location (0, 0) in the second context-adaptive scan order 1022 indicates the assigned context-adaptive scan order position (1) assigned based on the magnitude of the corresponding estimated probability. The entropy coding context locations—(0, 1), (0, 2), (1, 0), (1, 1), (1, 2), (2, 0), and (2, 1)—indicated by the stippled background in the second context-adaptive scan order 1022 include assigned context-adaptive scan order positions (2-8) assigned based on a zig-zag scan order. In some implementations, the transform block may be generated using, for example, a two-dimensional (2D) DCT transform, and the zig-zag scan order may correspond with an ascending transform frequency based scan order.

The third context-adaptive scan order 1024 includes assigned context-adaptive scan order positions for the entropy coding context locations identified by topologically, or recursively, sorting the entropy coding context locations based on non-zero-coefficient probability magnitude. The location indicated with the cross-hatched background in the third context-adaptive scan order 1024 corresponds with the current non-zero-coefficient probability location (2, 2). The top-left entropy coding context location (0, 0) in the third context-adaptive scan order 1024 indicates the assigned context-adaptive scan order position (1) assigned based on the magnitude of the corresponding estimated probability. The entropy coding context locations—(0, 1), (0, 2), (1, 0), (1, 1), (1, 2), (2, 0), and (2, 1)—indicated by the stippled background in the third context-adaptive scan order 1024 include assigned context-adaptive scan order positions (2-8) assigned based on topologically, or recursively, sorting the entropy coding context locations based on non-zero-coefficient probability magnitude.

In some implementations, topologically, or recursively, sorting the entropy coding context locations based on non-zero-coefficient probability magnitude may include identifying a current entropy coding context location, identifying context locations for the current entropy coding context location, identifying a context location scan order, identifying a current location scan order, or a combination thereof.

Identifying a current entropy coding context location may be similar to identifying a current transform coefficient location as shown at 920 in FIG. 9, except that the current entropy coding context location may be the entropy coding context location having the greatest magnitude. For example, in FIG. 10, the entropy coding context location (0, 2) having the greatest magnitude (0.45) among the entropy coding context locations indicated by the stippled background in the third context-adaptive scan order 1024 may be identified as the current entropy coding context location.

Identifying context locations for the current entropy coding context location may be similar to identifying context locations as shown at 930 in FIG. 9, except that the context locations may be identified based on the current entropy coding context location. For example, in FIG. 10, in the third context-adaptive scan order 1024, the current entropy coding context location may be the entropy coding context location (0, 2), and the context locations for the current entropy coding context location (0, 2) may be identified as the context locations (0, 0) and (0, 1).

Identifying a context location scan order may be similar to the context scan order identification shown at 940 in FIG. 9, except that the context location scan order may be identified for the context locations (0, 0) and (0, 1) for the current entropy coding context location (0, 2). As shown in the third context-adaptive scan order 1024, the top-left entropy coding context location (0, 0) in the third context-adaptive scan order 1024 indicates the assigned context-adaptive scan order position (1) assigned based on the magnitude of the corresponding estimated probability. The minimal or lowest (2) unassigned context-adaptive scan order position may be identified as, or assigned as, the context-adaptive scan order position for the entropy coding context location (0, 1), as shown in the third context-adaptive scan order 1024.

Identifying a current location scan order for the current entropy coding context location (0, 2) may be similar to identifying a current location scan order at 950 as shown in FIG. 9, except that the current location scan order may be identified for the current entropy coding context location (0, 2). For example, the minimal or lowest (3) unassigned context-adaptive scan order position may be identified as, or assigned as, the context-adaptive scan order position for the current entropy coding context location (0, 2), as shown in the third context-adaptive scan order 1024.

In the example shown at 1024, the entropy coding context location (1, 0) having the greatest magnitude (0.41) among the unassigned entropy coding context locations indicated by the stippled background in the third context-adaptive scan order 1024, such as subsequent to assigning the third scan order to the entropy coding context location (0, 2), may be identified as the current entropy coding context location, the context locations for the current entropy coding context location (1, 0) may be identified as the context location (0, 0), the entropy coding context location (0, 0) may have an assigned context-adaptive scan order position (1), and the minimal or lowest (4) unassigned context-adaptive scan order position may be identified as, or assigned as, the context-adaptive scan order position for the current entropy coding context location (1, 0), as shown in the third context-adaptive scan order 1024.

In the example shown at 1024, the entropy coding context location (2, 0) having the greatest magnitude (0.33) among the unassigned entropy coding context locations indicated by the stippled background in the third context-adaptive scan order 1024, such as subsequent to assigning the fourth scan order to the entropy coding context location (1, 0), may be identified as the current entropy coding context location, the context locations (0, 0) and (1, 0) for the current entropy coding context location (2, 0) may have assigned context-adaptive scan order positions, and the minimal or lowest (5) unassigned context-adaptive scan order position may be identified as, or assigned as, the context-adaptive scan order position for the current entropy coding context location (2, 0), as shown in the third context-adaptive scan order 1024.

In the example shown at 1024, the entropy coding context location (1, 2) having the greatest magnitude (0.28) among the unassigned entropy coding context locations indicated by the stippled background in the third context-adaptive scan order 1024, such as subsequent to assigning the fifth scan order to the entropy coding context location (2, 0), may be identified as the current entropy coding context location, the context locations (0, 0), (0, 1), (0, 2), and (1, 0) for the current entropy coding context location (2, 0) may have assigned context-adaptive scan order positions, the context location (1, 1) for the current entropy coding context location (2, 0) may be an unassigned context location, the minimal or lowest (6) unassigned context-adaptive scan order position may be identified as, or assigned as, the context-adaptive scan order position for the unassigned context location (1, 1), and the next minimal or lowest (7) unassigned context-adaptive scan order position may be identified as, or assigned as, the context-adaptive scan order position for the current entropy coding context location (1, 2), as shown in the third context-adaptive scan order 1024.

In the example shown at 1024, the entropy coding context location (2, 1) having the greatest magnitude (0.26) among the unassigned entropy coding context locations indicated by the stippled background in the third context-adaptive scan order 1024, such as subsequent to assigning the seventh scan order to the entropy coding context location (1, 2), may be identified as the current entropy coding context location, the context locations (0, 0), (0, 1), (1, 0), (1, 1), and (2, 0) for the current entropy coding context location (2, 0) may have assigned context-adaptive scan order positions, and the next minimal or lowest (8) unassigned context-adaptive scan order position may be identified as, or assigned as, the context-adaptive scan order position for the current entropy coding context location (2, 1), as shown in the third context-adaptive scan order 1024.

The fourth context-adaptive scan order 1026 includes assigned context-adaptive scan order positions for the estimated non-zero-coefficient probability matrix 1000, as shown in the second context-adaptive scan order 1022, and includes assigned context-adaptive scan order positions (9-16) for the entropy coding context locations—(2, 2), (0, 3), (3, 0), (3, 1), (1, 3), (3, 2), (2, 3), and (3, 3)—assigned based on the magnitude of the corresponding estimated probabilities.

The fifth context-adaptive scan order 1028 includes assigned context-adaptive scan order positions for the estimated non-zero-coefficient probability matrix 1000, as shown in the third context-adaptive scan order 1024, and includes assigned context-adaptive scan order positions (9-16) for the entropy coding context locations—(2, 2), (0, 3), (3, 0), (3, 1), (1, 3), (3, 2), (2, 3), and (3, 3)—assigned based on the magnitude of the corresponding estimated probabilities.

Figure 11:
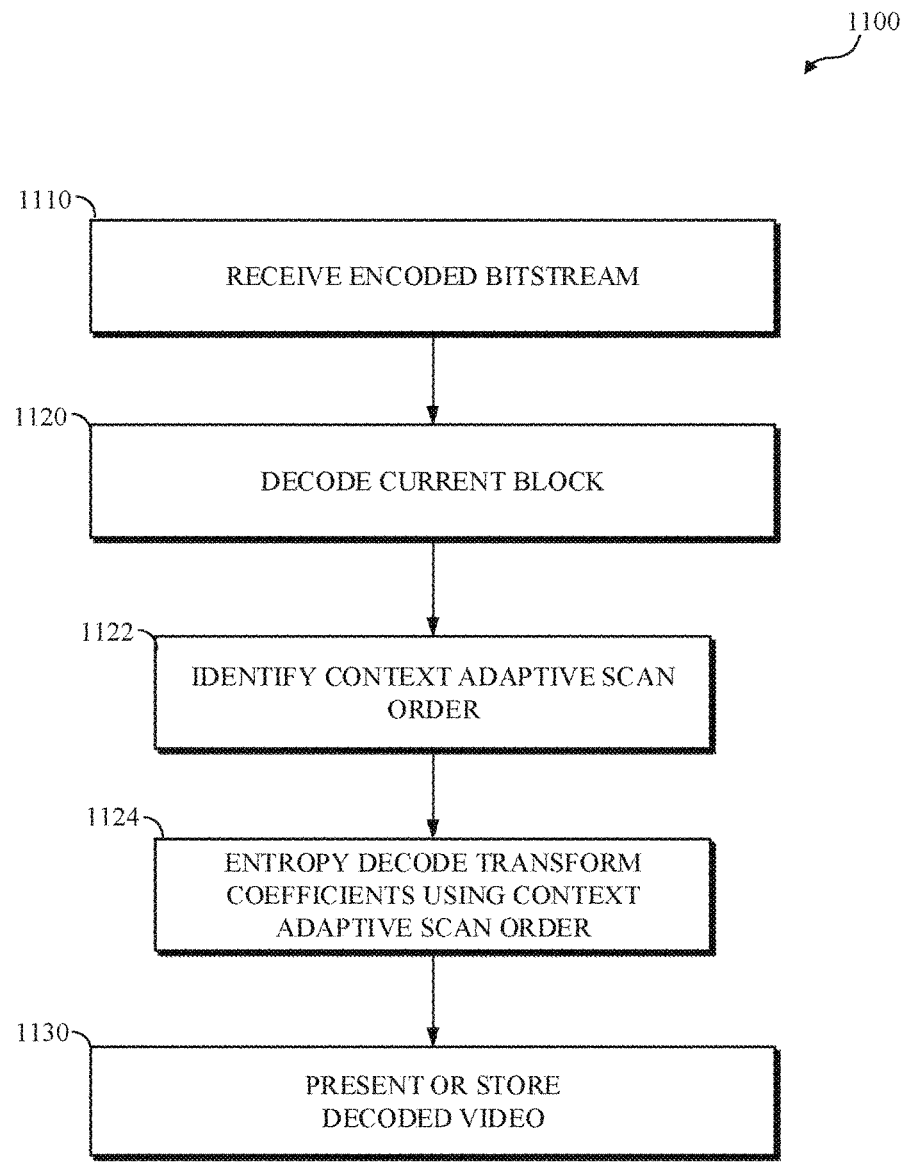
FIG. 11 is a flowchart diagram of decoding using a context-adaptive scan order for entropy coding according to implementations of this disclosure.

FIG. 11 is a flowchart diagram of decoding using a context-adaptive scan order for entropy coding according to implementations of this disclosure. In some implementations, decoding using a context-adaptive scan order for entropy coding 1100 may be implemented in a decoder, such as the decoder 500 shown in FIG. 5. For example, the entropy decoding stage 502 of the decoder 500 shown in FIG. 5 may implement decoding using a context-adaptive scan order for entropy coding. In some implementations, decoding using a context-adaptive scan order for entropy coding may include receiving an encoded bitstream, or a portion thereof, at 1110, decoding a current block at 1120, presenting or storing the decoded video at 1130, or any combination thereof.

In some implementations, decoding the current block at 1120 may include identifying a context-adaptive scan order at 1122, entropy decoding the transform coefficients (or the quantized transform coefficients) at 1124, or a combination thereof. In some implementations, identifying the context-adaptive scan order at 1122 may be similar to identifying a context-adaptive scan order for entropy coding as shown at 900 in FIG. 9.

Other implementations of the diagram of contextual entropy decoding as shown in FIG. 11 are available. In implementations, additional elements of contextual entropy decoding can be added, certain elements can be combined, and/or certain elements can be removed. For example, in an implementation, contextual entropy decoding can include an additional element involving generating entropy coding models.

In some implementations, contextual entropy decoding may include storing each decoded coefficient for a block in a decoder coefficient register, which may be stored in a data storage unit, such as the memory 204 shown in FIG. 2, and identifying the context coefficients at 1120 may include reading the context coefficients from the decoder coefficient register.

In some implementations, the size of the context coefficient register may be a function of the size of the coefficient matrix used for coding. For example, the coefficient matrix may be an N×M matrix, such as a 32×32 matrix, encoded using a non-contiguous coding order, such as the coding order partially shown in FIG. 9, and the context coefficient register may include N*M coefficients, such as 1024 (32*32=1024) coefficients. In some implementations, each coefficient may be stored using B bits, such as 3 bits, and the size of the context coefficient register may be B*N*M bits, such as 3072 bits (1024*3 bits).

Figure 12:
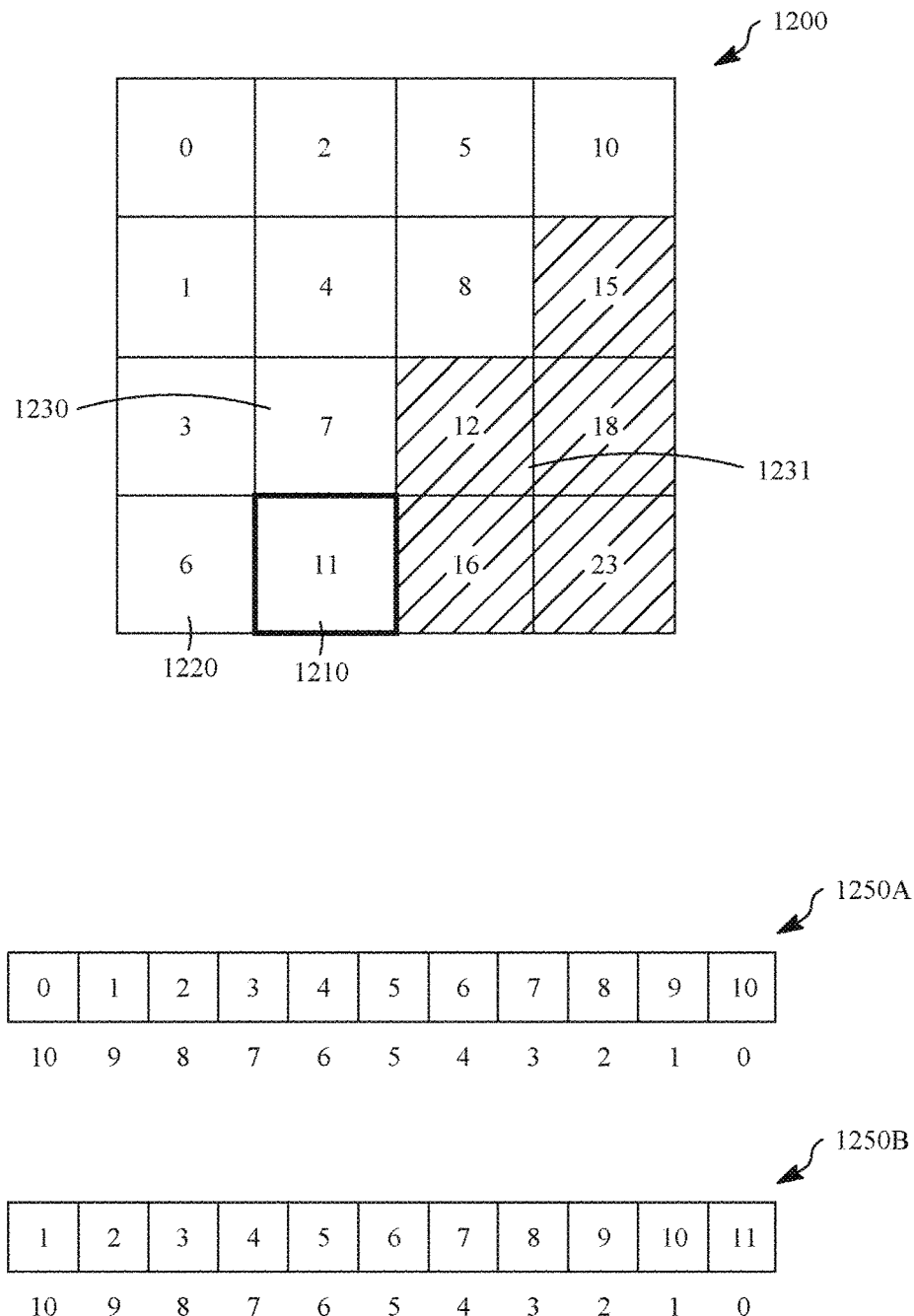
FIG. 12 is a diagram of an example of a representation of a portion of a transform coefficient scan pattern for encoding and decoding using efficient context handling in arithmetic coding according to implementations of this disclosure.

FIG. 12 is a diagram of an example of a representation of a portion 1200 of a transform coefficient scan pattern for encoding and decoding using efficient context handling in arithmetic coding according to implementations of this disclosure. The scan pattern can be an original scan order or a new scan order as described with respect to FIG. 13. In some implementations, efficient context handling in arithmetic coding may include decoding a current coefficient based on a reduced size context coefficient register. For example, efficient context handling in arithmetic coding may include decoding a current coefficient for a 32×32 matrix encoded using the non-contiguous coding order, such as the non-contiguous coding order partially shown in FIG. 9 or at 1200 in FIG. 12, based on a context coefficient register including 87 coefficients.

In an example, a current coefficient 1210 at scan order location 11 may be decoded using the coefficient to the left of the current coefficient, such as the coefficient 1220 at scan order location 6, the coefficient above the current coefficient, such as the coefficient 1230 at scan order location 7, or a combination thereof. In FIG. 12, the current scan order location, corresponding to the current encoded coefficient, is shown with a bold border, scan order locations corresponding to decoded coefficients are shown with a white background, and scan order locations corresponding to encoded coefficients are shown with a lined background.

An example of a portion 1250A of the context coefficient register is shown, including the coefficients at scan order locations 10, 9, 8, 7, 6, 5, 4, 3, 2, 1, and 0. The portion of the context coefficient register after a shift operation is shown at 1250B, and includes the coefficients at scan order locations 11, 10, 9, 8, 7, 6, 5, 4, 3, 2, and 1.

Figure 13:
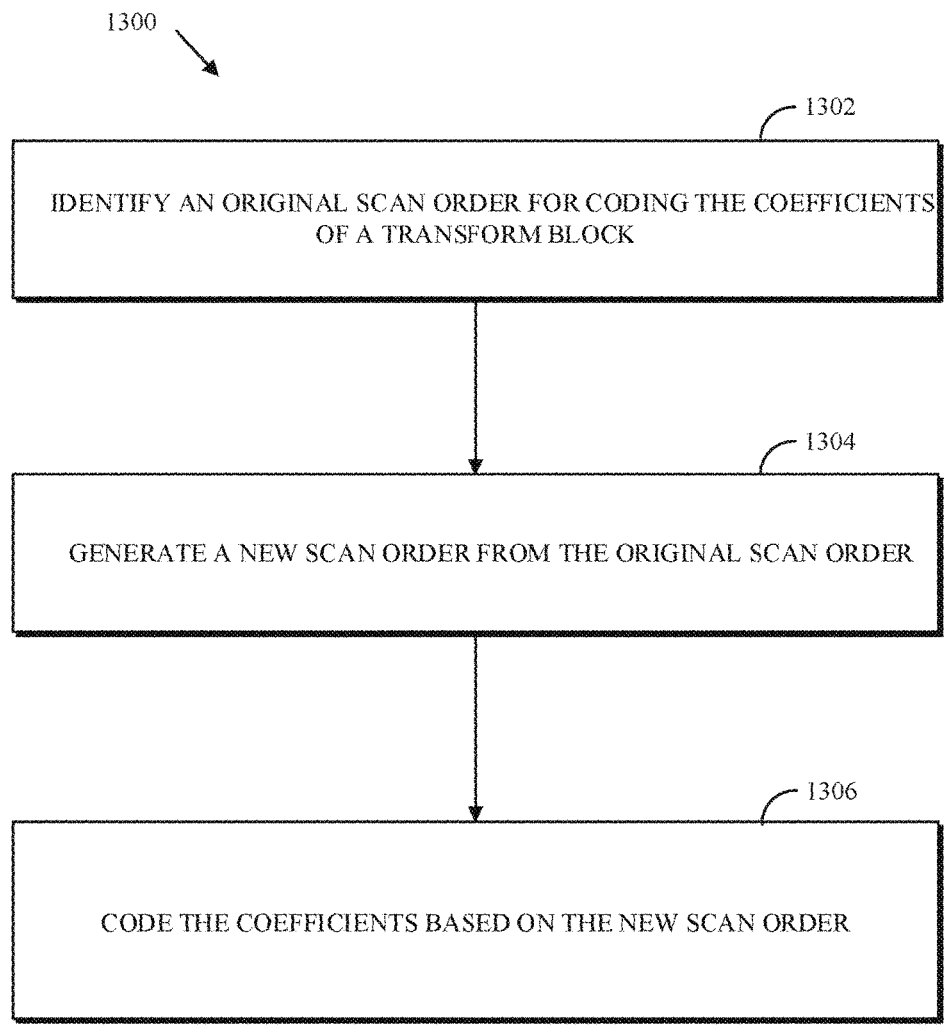
FIG. 13 is a flowchart of a process for coding a quantized transform block of coefficients according to an implementation of this disclosure.

FIG. 13 is a flowchart of a process 1300 for coding a quantized transform block of coefficients according to an implementation of this disclosure. The process 1300 generates a new scan order from an original scan order. The new scan order is such that the maximum scan distance in the new scan order is less than or equal to a predetermined distance. The new scan order can be used to optimize codec hardware implementations by limiting the size of the line buffer. The process 1300 includes identifying 1302 an original scan order for coding the coefficients of the quantized transform block, generating 1304 a new scan order from the original scan order, and coding 1306 the coefficients based on the new scan order.

In this context, both of "quantized transform block" and "transform block" encompass quantized and non-quantized transform blocks; and both of "quantized transform coefficient" and "transform coefficient" encompass quantized and non-quantized transform coefficients. That is, for example, a reference to a "transform coefficient" can be a reference to either a quantized transform coefficient or a reference to an un-quantized transform coefficient, depending on whether the codec is encoding quantized or non-quantized transform coefficients.

The process 1300 can be implemented in a decoder, such as the decoder 500. In an implementation, the process 1300 can be implemented at least partially by the entropy decoding stage 502 of the decoder 500 of FIG. 5. The process 1300 can be implemented by a receiving station, such as the receiving station 106 of FIG. 1. The process 1300 can be implemented in an encoder, such as the encoder 400 of FIG. 4. In an implementation, the process 1300 can be implemented at least partially by the entropy encoding stage 408 of the encoder 400 of FIG. 4. The process 1300 can be implemented by a transmitting station, such as the transmitting station 102 of FIG. 1.

The process 1300 can be implemented, for example, as a software program that can be executed by computing devices. The software program can include machine-readable instructions that can be stored in a memory, such as the memory 204 or the secondary storage 214, and that can be executed by a processor, such as the CPU 202, to cause the computing device to perform the process 1300. The process 1300 can be implemented using specialized hardware or firmware. Some computing devices can have multiple memories, multiple processors, or both. The steps or operations of the process 1300 can be distributed using different processors, memories, or both. Use of the terms "processor"

or "memory" in the singular encompasses computing devices that have one processor or one memory as well as devices that have multiple processors or multiple memories that can be used in the performance of some or all of the recited steps or operations.

When implemented by an encoder, the process 1300 can receive (not shown) a quantized transform block, such as a quantized transform block generated by the quantization stage 406 of FIG. 4, and encode the quantized transform block in an encoded bitstream, such as the compressed bitstream 420 of FIG. 4. When implemented by an encoder, "coding" means encoding in a compressed bitstream.

When implemented by a decoder, the process 1300 decodes from an encoded bitstream, such as the compressed bitstream 420 of FIG. 5, a block of quantized transform coefficients. When implemented by a decoder, "coding" means decoding from a compressed bitstream.

At 1302, the process 1300 identifies an original scan order for coding the coefficients of the quantized transform block. The scan order can be identified in any way. For example, the original scan order can be identified as described with respect to 824 of FIG. 8, as described with respect to 940 of FIG. 9, or as described with respect to 1124 of FIG. 11.

At 1304, the process 1300 generates a new scan order from the original scan order. The new scan order is such that a maximum scan distance of the new scan order is less than or equal to a maximum distance. The maximum distance can be a predefined maximum distance. In an example, the process 1300 can generate the new scan order by overwriting (e.g., replacing) the original scan order. In another example, the process 1300 can generate the new scan order as a data structure separate from the original scan order.

At 1306, the process 1300 codes the coefficients of the transform based on (i.e., using) the new scan order. When implemented by an encoder, coding 1306 can be, or can be similar to, transmitting or storing an output bitstream at 830 of FIG. 8. When implemented by a decoder, coding 1306 can be, or can be similar to, decoding a current block at 1120 of FIG. 11.

Returning to generating a new scan order from the original scan order, a new scan order can be generated from the original scan order at 1304. As described above, the scan distance for a coefficient (i.e., scan_distance) can be defined as the maximum difference between the coefficient's scan index (i.e., scan_idx) and the scan index of the coefficient's context neighbors (i.e., neighbor_scan_idx). A context neighbor is a coefficient of the transform block that can be used as context for determining a probability model for entropy coding the coefficient. The scan index of a coefficient can be determined using equation 1:

$$\text{scan\_distance} = \text{scan\_}idx - \text{neighbor\_scan\_}idx \quad (1)$$

For example, and referring to FIG. 12, the scan distance of the current coefficient 1210 is the maximum of the scan distances of the current coefficient 1210 with respect to the coefficients 1220 and 1230, where the coefficients 1220 and 1230 are the context coefficients for coding the current coefficient 1210. As such, the scan distance of the current coefficient 1210 can be given by max(11−7, 11−6)=max (4, 5)=5.

The maximum scan distance of the new scan order is the maximum of the scan distances of some of the coefficients (i.e., a maximum of the respective scan distances of at least some of the coefficients) in the new scan order; and, as mentioned above, the scan distance of a coefficient is the maximum of the scan distances between the coefficient and each of its context coefficients (i.e., a maximum of the respective scan distances between the coefficient and each of the context coefficients of the coefficient). In an implementation, the scan distances of less than all the transform coefficients are used to determine the maximum scan distance of the scan order. For example, the scan distances of zero transform coefficients that are beyond the end-of-block transform coefficient are not used. In an implementation, the maximum scan distance can be determined using the scan distances of each of the coefficients of the transform block.

Generating a new scan order from the original scan order can include assigning, to at least some of the coefficients, new respective scan indexes in the new scan order. That is, the process 1300 can assign to each of the transform coefficients a new scan index in the new scan order. The new scan index can be the same or a different scan index than the scan index in the original scan order.

In an example, the process 1300 can modify the original scan order (e.g., org_scan_arr[ ]) to a new scan order (e.g., new_scan_arr[ ]), such that the scan distance between each coefficient and its context neighbors is less than or equal to the predetermined distance (e.g., max_distance). The original scan order (e.g., org_scan_arr[ ]) and the new scan order (e.g., new_scan_arr[ ]) can be one-dimensional arrays that map scan indexes (scan_idx) to coefficient indexes (coeff_idx).

For example, and referring to FIG. 7, the coefficients of the transform block 700 can be converted to coefficient indexes according to a raster scan order using the formula:

coeff_*idx*=coefficient_row*transform_block_width+
coefficient_*col*

For example, the coefficient index (coeff_idx) of coefficient 701 of FIG. 7 (which is at column index 1 and row index 2 of the transform block 700) can be given by coeff_idx=2*4+1=9. Accordingly, when using the vertical scan order 704, org_scan_arr[6]=9 (i.e., scan position 705). That is, the scan position 6 (i.e., the scan position 705) contains the coefficient with coeff_idx 9 (i.e., the coefficient 701).

In an implementation, the process 1300 can sequentially (i.e., starting from 0 to the number of coefficients in the transform block) visit the scan positions of the original scan order to generate the new scan order. The process 1300 can use a queue that keeps track of (e.g., includes a reference to) coefficients that have at least one context neighbor that has been scanned. A context neighbor is as described above with respect to a context coefficient. That is, "context neighbor" and "context coefficient" can be used interchangeably in the context of the process 1300. A "context neighbor that has been scanned" refers to a transform coefficient that has been assigned a scan position in the new scan order. When a coefficient is assigned a scan index in the new scan order (i.e., when the coefficient is processed), the coefficients for which the coefficient is a context neighbor are pushed into the queue.

For example, and referring to FIG. 12, and in the case where the left and top neighbors of a coefficient are used as context neighbors, the coefficient 1230 is a context neighbor for the coefficients 1210 and 1231. This is so because the coefficient 1230 is the top neighbor of the coefficient 1210 and is the left neighbor of the coefficient 1231. Said another way, the coefficient 1210 is the coefficient that is immediately below the coefficient 1230, and the coefficient 1231 is the coefficient that is to the immediate right of the coefficient 1230. As such, when the process 1300 assigns a new index to the coefficient 1230, the process 1300 can push (i.e., add) the coefficients 1210 and 1231 onto the queue. Again, for illustration purposes, the top and right neighbors are used as context coefficients. However, the disclosure is not so limited. The context coefficients can be any other coefficients.

The queue can be used to monitor the scan distance of the coefficients in the queue with respect to a next scan position to be assigned to a coefficient in the new scan order. As described above, the scan positions of the original scan order are processed sequentially. However, before assigning a new scan position in the new scan order to a coefficient, the process 1300 determines whether the queue head coefficient (i.e., the coefficient at the head of the queue) would have a scan distance that exceeds a limit (i.e., a conservative maximum distance). The limit can be a safety limit that is less than the predetermined distance. If the conservative maximum distance would be exceeded, then the process 1300 can process those coefficients on the queue of which conservative maximum distance would be exceeded before processing the coefficient suggested by the original scan order.

The conservative maximum distance can be used to account for the situation where multiple coefficients may be popped off the queue. Popping a coefficient off the queue, as further described below, means to remove the coefficient off the queue and to assign a new scan position to it in the new scan order. Coefficients in the queue that share the same context neighbor (i.e., co-parent coefficients) are popped off the queue together. Popping co-parent coefficients together prevents the maximum scan distance of the new scan order from exceeding the predetermined distance. With every co-parent coefficient that is popped off the queue, the maximum scan distance in the new scan order approaches the predetermined distance by 1. As such, the conservative maximum distance is used to initiate assigning new scan positions to coefficients on the queue to circumvent the situation where, if new scan positions were to be assigned later to these coefficient, the scan distances (in the new scan order) of these coefficients would exceed the predetermined distance.

To reiterate, instead of assigning a next scan position value (i.e., the next scan position ready to be assigned) to one coefficient that is not in the queue, the next scan position value (and, potentially, subsequent scan positions value(s)) may need to be assigned to coefficients that are in the queue when the safety limit (conservative maximum distance) is exceeded.

The maximum number of coefficients that share the same neighbor_scan_idx with its previous coefficient in the queue (i.e., max_increased_scan_distance) can be given by equation (2):

$$\text{max\_increased\_scan\_distance} = \text{ceiling}(\text{max\_unscanned\_neighbors}*(\text{max\_context\_neighbors}-1)/\text{max\_context\_neighbors}) \quad (2)$$

As such, in some implementations, the process 1300 can traverse each coefficient according to the original scan order, and before assigning an incremental scan index (i.e., a next scan position in the new scan order, scan_idx) to the coefficient, the process 1300 assigns the next scan position in the new scan order (scan_idx) to the coefficients in the queue whose scan distances are equal to or greater than the conservative maximum distance.

As such, in an implementation, generating the new scan order can include assigning a new scan index to a current coefficient that is immediately followed by a next coefficient in the original scan order and is a context coefficient for entropy coding another coefficient, on a condition that a scan distance of the other coefficient is greater than or equal to the conservative maximum distance, assigning a next scan index to the other coefficient before assigning the next scan index to the next coefficient.

In an implementation, generating the new scan order can include assigning a new scan index to a current coefficient which is preceded by a previous coefficient in the original scan order, identifying a coefficient for which the previous coefficient is a context coefficient, and, on a condition that a scan distance of the coefficient is greater than or equal to a conservative maximum distance, assigning a next scan index to the coefficient before assigning the next scan index to another coefficient subsequent to the current coefficient.

The conservative maximum distance can be given by the following equation (3):

$$\text{conserve\_max\_distance} = \text{max\_distance} - \text{ceiling}(\text{max\_unscanned\_neighbors}*(\text{max\_context\_neighbors}-1)/\text{max\_context\_neighbors}) \quad (3)$$

In equation (3), max_context_neighbors is the maximum number of coefficients that use the same coefficient as context information; max_distance is the predetermined distance as described above; max_unscanned_neighbors is the maximum number of coefficients that can be in the queue. That is, max_unscanned_neighbors is the maximum number of un-scanned (i.e., not yet processed) coefficients for which at least one context coefficient has been scanned (i.e., processed). For example, in the case where the above and left coefficients are used as context coefficients, max_unscanned_neighbors can be given by equation (4):

$$\text{max\_unscanned\_neighbors} = tx\_width + tx\_height - 2 \quad (4)$$

In equation (4), tx_width is the width of the transform block and tx_height is the height of the transform block. Equation (4) reflects a constraint of the original scan order, namely, that when a coefficient is scanned, then its left and above neighbors were previously scanned. That is, the context coefficients are expected to be scanned before the current coefficient being encoded.

Figure 14:
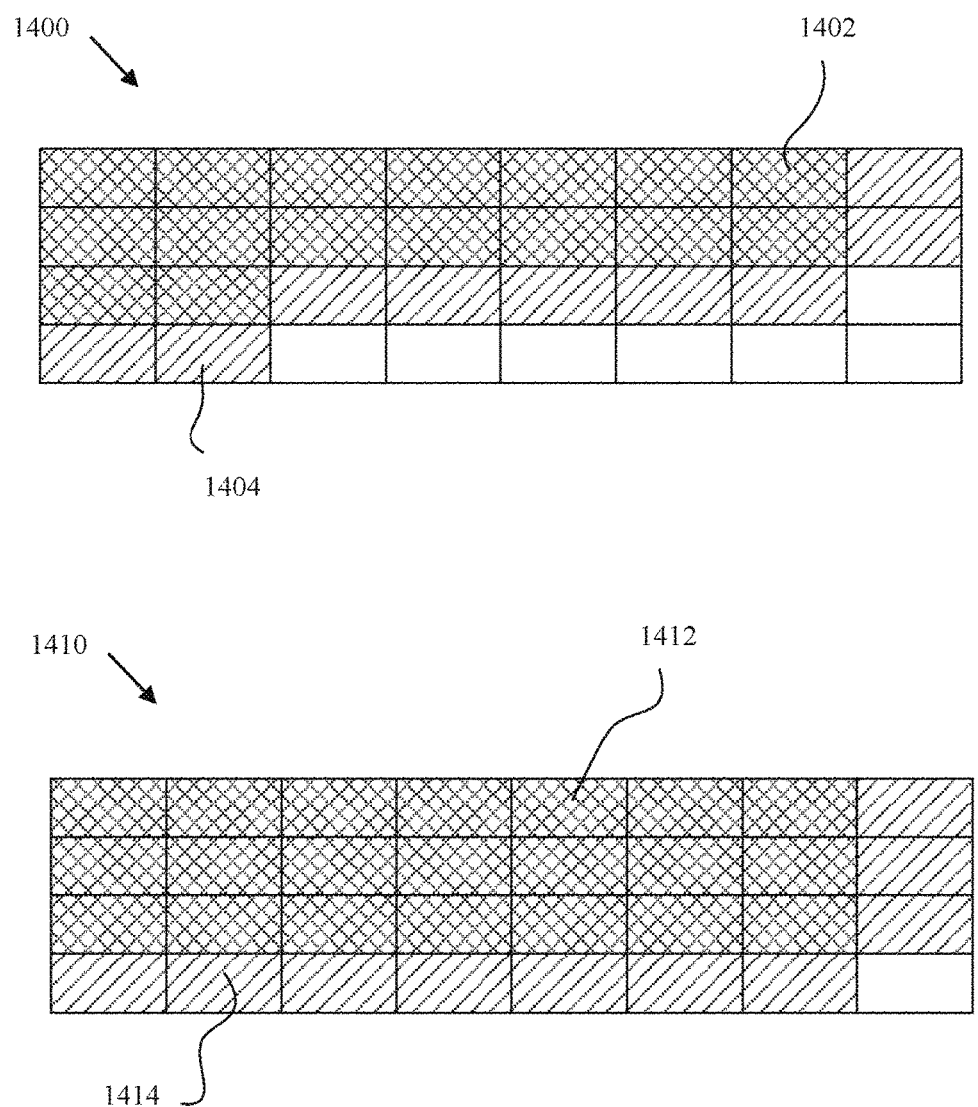
FIG. 14 is an illustration of examples of the maximum number of coefficients that can be in the queue according to implementations of this disclosure

FIG. 14 is an illustration of examples 1400 and 1410 of the maximum number of coefficients that can be in the queue according to implementations of this disclosure. The examples 1400 and 1410 depict transform blocks with a width (tx_width) of 8 and a height (tx_height) of 4. In the example 1400, the blocks shaded as block 1402 are scanned (i.e., processed) coefficients, and the blocks shaded as block 1404 are un-scanned coefficients (i.e., coefficients in the queue) that have at least one scanned context neighbor. As can be seen in the example 1400, there are a total of 9 un-scanned coefficients. On the other hand, in the example 1410, which illustrates the maximum number of un-scanned coefficients, there are 21 scanned coefficients 1412 and 10 (i.e., 8+4−2) un-scanned coefficients 1414.

A pseudocode of an example function (limit_neighbor_distance) of modifying a scan order to limit the scan distance is now given.

The function takes as inputs the original scan order (org_scan_arr), the width of the transform block (tx_width), the height of the transform block (tx_height), the maximum number of coefficients that use a same neighboring coefficient as context information (max_context_neighbors), and the predetermined distance (max_distance) that is the desired maximum difference between scan indexes of each coefficient and its context neighbors. The function generates the new scan order array (new_scan_arr) as output.

The function uses as variables the number of coefficients in the transform block (coeff_num), a to-be-assigned scan index (new_scan_idx) in the new scan order (new_scan_arr), a queue (queue) for storing the coefficients such that each coefficient has at least one scanned context neighbor, an array (visited) which indicates the processing status of a coefficient of the transform block, max_unscanned_neighbors as described above with respect to FIG. 14, and conserve_max_distance as described above with respect to FIG. 13.

In the queue, a coefficient is stored as an "item" object containing the coefficient's parent's scan index (i.e., the scan index of a context coefficient of the coefficient) in the new scan order (neighbor_scan_idx) and the coefficient's own coefficient index; queue.top indicates the item to be popped off the queue (i.e., the head of the queue); queue.pop( ) pops (i.e., removes and returns) the head item off the queue; queue.push (item) pushes (adds to the head of the queue) the item. With respect to the visited array, a value of NOT_VISITED at a coefficient index indicates that the coefficient has not been scanned and is not on the queue, a value of IN_QUEUE indicates that the coefficient is in the queue, and a value of SCANNED indicates that the coefficient has been assigned a new scan index in the new scan order. The limit_neighbor_distance( ) function can be as follows:

```
limit_neighbor_distance( ) {
        coeff_num = tx_width * tx_height
        for (coeff_idx = 0 to coeff_num - 1) {
                visited[coeff_idx] = NOT_VISITED
        }
        max_unscanned_neighbors = tx_width + tx_height - 2
        conserve_max_distance =
                        max_distance -
                        ceiling(max_unscanned_neighbors *
                        (max_context_neighbors - 1)/max_context_neighbors)
        new_scan_idx = 0
        for (org_scan_idx = 0 to coeff_num - 1) {
                while ( (queue.is_empty( ) == False) and
                        new_scan_idx-queue.top.neighbor_scan_idx>=
                        conserve_max_distance) {
                        assign_scan_index( queue.top.coeff_idx, new_scan_idx,
                                        new_scan_arr,
                                        visited, tx_width, tx_height,
                                        new_scan_arr, queue)
                        queue.pop( )
                }
                coeff_idx = org_scan_arr[org_scan_idx]
                assign_scan_index( coeff_idx, new_scan_idx, new_scan_arr, visited,
                                tx_width, tx_height, new_scan_arr, queue)
        }
}
```

The function limit_neighbor_distance( ) uses a helper function assign_scan_index( ). The function assign_scan_index assigns a new_scan_index in the new scan order to a position corresponding to the coefficient index (coeff_idx). After assigning the scan_id, the function pushes onto the queue the coefficients that use the coefficients at coeff_idx as context information. The coefficients that use the coefficients at coeff_idx as context information are referred to in assign_scan_index as neighbors. The function assign_scan_index( ) takes as input a coefficient's index (coeff_idx), the to-be-assigned scan index (new_scan_idx) in the new scan order, the new scan order array (new_scan_arr), the transform block width (tx_width), and the transform block height (tx_height).

The assign_scan_index( ) generates as output or modifies the to-be-assigned scan index (new_scan_idx), the new scan order array (new_scan_arr), the queue (queue), and the visited array. The assign_scan_index ( ) function can be as follows:

```
assign_scan_index( ) {
        if (visited[coeff_idx] != SCANNED) {
                visited[coeff_idx] = SCANNED
                new_scan_arr[new_scan_idx] = coeff_idx
                row = coeff_idx / tx_width
                col = coeff_idx % tx_width
                if (row + 1 < tx_height) {
                        down_neighbor_coeff_idx = coeff_idx + tx_width
                        if (visited[down_neighbor_coeff_idx] == NOT_VISITED) {
                                visited[down_neighbor_coeff_idx] = IN_QUEUE
                                item = new item
```

```
                    item.neighbor_scan_idx = new_scan_idx
                    item.coeff_idx = down_neighbor_coeff_idx
                queue.push(item)
            }
        }
        if (col + 1 < tx_width) {
            right_neighbor_coeff_idx = coeff_idx + 1
            if (visited[right_neighbor_coeff_idx] == NOT_VISITED) {
                    visited[right_neighbor_coeff_idx] = IN_QUEUE
                    item.neighbor_scan_idx = new_scan_idx
                    item.coeff_idx = right_neighbor_coeff_idx
                    queue.push(item)
                }
            }
            new_scan_idx = new_scan_idx + 1
        }
    }
```

Implementations according to this disclosure can generate a new scan order, such that the maximum scan distance in the new scan order is less than or equal to the desired predetermined distance (e.g., max_distance). As there may be more than one coefficient in the queue that share the same neighbor scan index, the conservative maximum distance, discussed above, can be used to ensure that assigning scan positions to items on the queue can be undertaken (i.e., coefficients on the queue are processed) so that the maximum scan distance does not exceed the desired predetermined distance. As such, the conservative maximum distance can be used as a trigger and a safety limit to initiate assigning scan positions to items on the queue.

A hypothetical example of queue entries is given in Table I. The example of Table I assumes that the maximum number of coefficients that use a same neighboring coefficient as context information (max_context_neighbors) is 2, the maximum number of un-scanned (i.e., not yet processed) coefficients for which at least one context coefficient has been scanned (max_unscanned_neighbors) is 8 (as such, the queue is considered full because it includes 8 entries), the conservative maximum distance (conserve_max_distance) is 10, and the desired predetermined distance (max_distance) is 14 (as calculated from equation (3)).

TABLE I

| | pop order | | | | | | | |
|---|---|---|---|---|---|---|---|---|
| | 0 | 1 | 2 | 3 | 4 | 5 | 6 | 7 |
| neighbor_scan_idx | 7 | 7 | 8 | 8 | 9 | 9 | 10 | 10 |
| scan_idx | 17 | 18 | 19 | 20 | 21 | 22 | 23 | 24 |
| scan_distance | 10 | 11 | 11 | 12 | 12 | 13 | 13 | 14 |

The "pop order" column shows the queue position. The pop order 0 refers to the head (the first entry) of the queue. The head of the queue is the next entry to be popped off the queue. The shaded columns of Table I indicate coefficients that share the same context coefficient (neighbor_scan_idx) as the coefficient to its left. For example, the coefficients at queue pop order locations 0 and 1 share the same context coefficient, namely, the context coefficient having scan position 7 in the new scan order.

Implementations according to this disclosure assign scan positions to the coefficients on the queue such that the maximum scan distance does not exceed the predetermined distance. The coefficients in the queue are processed when the scan distance of the coefficient at the head of the queue exceeds or is equal to the conservative maximum distance.

As such, scan positions are assigned, in the new scan order, as shown in the row scan_idx. The coefficient at queue location 0 (pop order=0) is assigned to the scan position 17 (scan_idx=17) in the new scan order; the coefficient at queue location 1 (pop order=1) is popped off the queue next and is assigned to the next scan position 18; and so on. The row scan_distance of Table I shows the scan distances (i.e., scan_idx−neighbor_scan_idx) based on the assigned scan positions. As can be seen, the smallest scan distance corresponds to the conservative maximum distance (i.e., 10) because the coefficient at pop location 0 is the first to be popped off the queue. As can also be seen, the maximum scan distance (i.e., 14) is assigned to the coefficients at pop location 7. The maximum scan distance does not exceed the predetermined distance (max_distance=14).

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content into an encoded video signal using an encoder 400 and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for coding a transform block of coefficients, comprising:
   identifying an original scan order for coding the coefficients;
   generating a new scan order from the original scan order such that a maximum scan distance of the new scan order is less than or equal to a predetermined distance, wherein generating the new scan order includes:
      assigning a new scan index to a current coefficient, the current coefficient being immediately followed by a next coefficient in the original scan order, and the current coefficient being a context coefficient for entropy coding another coefficient; and
      on condition that a scan distance of the other coefficient is greater than or equal to a conservative maximum distance, assigning a next scan index to the other coefficient before assigning the next scan index to the next coefficient;
   and
   coding the coefficients based on the new scan order.

2. The method of claim 1, wherein the predetermined distance is a size of a line buffer used for caching coded transform coefficients.

3. The method of claim 1, wherein generating the new scan order from the original scan order comprises:
   assigning, to at least some of the coefficients, respective scan indexes in the new scan order.

4. The method of claim 1, wherein the coefficient is immediately below or to an immediate right of the current coefficient in the transform block.

5. The method of claim 1, wherein
   the maximum scan distance is a maximum of respective scan distances of at least some of the coefficients, and
   a respective scan distance of a coefficient is a maximum of respective scan distances between the coefficient and each of context coefficients of the coefficient.

6. An apparatus for encoding a transform block of coefficients, comprising:
   a memory;
   a processor, wherein the memory includes instructions executable by the processor to:
      identify an original scan order for encoding the coefficients;
      generate a new scan order from the original scan order such that a maximum scan distance of the new scan order is less than or equal to a predetermined distance, wherein to generate the new scan order comprises to:
         assign a new scan index to a current coefficient, wherein the current coefficient is preceded by a previous coefficient in the original scan order;
         identify a coefficient that uses the previous coefficient as context coefficient; and
         on condition that a scan distance of the coefficient is greater than or equal to a conservative maximum distance, assign a next scan index to the coefficient before assigning the next scan index to another coefficient subsequent to the current coefficient;
      and
      encode, in an encoded bitstream, the coefficients based on the new scan order.

7. The apparatus of claim 6, wherein the predetermined distance is a size of a line buffer used for caching coded transform coefficients.

8. The apparatus of claim 6, wherein to generate the new scan order from the original scan order comprises to:
   assign, to at least some of the coefficients, respective scan indexes in the new scan order.

9. The apparatus of claim 6, wherein the coefficient is immediately below or to an immediate right of the current coefficient in the transform block.

10. The apparatus of claim 6, wherein
    the maximum scan distance is a maximum of respective scan distances of at least some of the coefficients, and
    a respective scan distance of a coefficient is a maximum of respective scan distances between the coefficient and each of context coefficients of the coefficient.

11. An apparatus for decoding a transform block of coefficients, comprising:
a memory;
a processor, wherein the memory includes instructions executable by the processor to:
identify an original scan order for decoding the coefficients;
generate a new scan order from the original scan order such that a maximum scan distance of the new scan order is less than or equal to a predetermined distance, wherein to generate the new scan order includes to:
assign a new scan index to a current coefficient, wherein the current coefficient is preceded by a previous coefficient in the original scan order;
identify a coefficient that uses the previous coefficient as context coefficient; and
on condition that a scan distance of the coefficient is greater than or equal to a conservative maximum distance, assign a next scan index to the coefficient before assigning the next scan index to another coefficient subsequent to the current coefficient; and
decode, from an encoded bitstream, the coefficients based on the new scan order.

12. The apparatus of claim 11, wherein the predetermined distance is a size of a line buffer used for caching coded transform coefficients.

13. The apparatus of claim 12, wherein to generate new scan order from the original scan order comprises to:
assign, to at least some of the coefficients, respective scan indexes in the new scan order.

14. The apparatus of claim 12, wherein
the maximum scan distance is a maximum of respective scan distances of at least some of the coefficients, and a respective scan distance of a coefficient is a maximum of respective scan distances between the coefficient and each of context coefficients of the coefficient.

* * * * *